United States Patent
Kikuchi

(10) Patent No.: US 10,483,863 B2
(45) Date of Patent: *Nov. 19, 2019

(54) ISOLATED SYNCHRONOUS RECTIFICATION-TYPE DC/DC CONVERTER

(71) Applicant: ROHM CO., LTD., Kyoto (JP)

(72) Inventor: Hiroki Kikuchi, Kyoto (JP)

(73) Assignee: ROHM CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/100,467

(22) Filed: Aug. 10, 2018

(65) Prior Publication Data

US 2018/0351470 A1     Dec. 6, 2018

Related U.S. Application Data

(63) Continuation of application No. 15/845,424, filed on Dec. 18, 2017, now Pat. No. 10,075,084.

(30) Foreign Application Priority Data

Dec. 16, 2016  (JP) ................. 2016-244701
Dec. 16, 2016  (JP) ................. 2016-244702
Nov. 9, 2017   (JP) ................. 2017-216050

(51) Int. Cl.
   *H02M 3/335*   (2006.01)
   *H02M 7/21*    (2006.01)
   (Continued)

(52) U.S. Cl.
   CPC ......... *H02M 3/33592* (2013.01); *H02J 1/102* (2013.01); *H02M 1/32* (2013.01);
   (Continued)

(58) Field of Classification Search
   CPC ......... H02M 2001/0006; H02M 3/335; H02M 3/33523; H02M 3/33553; H02M 3/33576; H02M 3/33592; H02M 1/32
   See application file for complete search history.

(56) References Cited

U.S. PATENT DOCUMENTS 7,345,896 B2    3/2008  Dalal
7,408,796 B2    8/2008  Soldano
(Continued)

FOREIGN PATENT DOCUMENTS

CN    102820764 A    12/2012
CN    105281578 A    1/2016
(Continued)

OTHER PUBLICATIONS

SIPO First Office Action corresponding to Application No. 201711337490.4; dated Jul. 31, 2019.

*Primary Examiner* — Gary L Laxton
(74) *Attorney, Agent, or Firm* — Cantor Colburn LLP

(57) ABSTRACT

A secondary controller drives a light emitting element of a photocoupler such that a detection voltage $V_{OUTS}$ corresponding to an output voltage $V_{OUT}$ generated in an output capacitor C approximates to a reference voltage $V_{REF}$. A primary controller controls a switching transistor M according to a feedback signal $V_{FB}$. A protection circuit is activated and drives the light emitting element of the photocoupler when detecting an abnormal state. An auxiliary power supply circuit includes a power supply capacitor C provided separately from the output capacitor C and supplies a power supply voltage $V_{CC}$ to the protection circuit and an anode of the light emitting element of the photocoupler.

26 Claims, 18 Drawing Sheets

(51) Int. Cl.
*H02M 3/156* (2006.01)
*H02J 1/10* (2006.01)
*H02M 3/337* (2006.01)
*H02M 1/32* (2007.01)
*H02M 1/00* (2006.01)

(52) U.S. Cl.
CPC ....... *H02M 3/1563* (2013.01); *H02M 3/3372* (2013.01); *H02M 7/21* (2013.01); *H02M 2001/0006* (2013.01); *Y02B 70/1475* (2013.01)

(56) References Cited

U.S. PATENT DOCUMENTS

| | | |
|---|---|---|
| 8,102,680 B2 | 1/2012 | Ren et al. |
| 8,625,313 B2 | 1/2014 | Yeh et al. |
| 9,935,559 B2 | 4/2018 | Kong et al. |
| 10,075,084 B2 * | 9/2018 | Kikuchi .................. H02M 1/32 |
| 2014/0160804 A1 * | 6/2014 | Sato .................. H02M 3/33507 363/21.01 |
| 2016/0036339 A1 * | 2/2016 | Kikuchi ............ H02M 3/33592 363/21.14 |
| 2016/0072399 A1 * | 3/2016 | Kikuchi ............ H02M 3/33592 363/21.14 |
| 2016/0181934 A1 | 6/2016 | Kikuchi et al. |
| 2016/0261204 A1 | 9/2016 | Kikuchi et al. |

FOREIGN PATENT DOCUMENTS

| | | |
|---|---|---|
| JP | 2009159721 A | 7/2009 |
| JP | 2016158387 A | 9/2016 |

* cited by examiner

ISOLATED SYNCHRONOUS RECTIFICATION-TYPE DC/DC CONVERTER

CROSS REFERENCE TO RELATED APPLICATIONS

The present application is a continuation application of U.S. patent application Ser. No. 15/845,424, filed on Dec. 18, 2017, the entire contents of which is incorporated herein by reference and priority to which is hereby claimed. Priority under 35 U.S.C. § 119(a) and 35 U.S.C. § 365(b) is hereby claimed from Japanese Patent Application 2016-244702 filed on Dec. 16, 2016, Japanese Application No. 2016-244701, filed on Dec. 16, 2016, Japanese Application No. 2017-216050, filed on Nov. 9, 2017, the entire contents of which is incorporated herein by reference.

BACKGROUND OF THE INVENTION

1. Field of the Invention

The present invention relates to an isolated synchronous rectification-type DC/DC converter.

2. Description of the Related Art

A flyback DC/DC converter is used for various power supply circuits such as an AC/DC converter. FIG. 1A is a circuit diagram of a diode rectification-type flyback converter 200R, and FIG. 1B is a circuit diagram of a synchronous rectification-type flyback converter 200S.

The flyback converter 200R of FIG. 1A receives an input voltage $V_{IN}$ at an input terminal P1 thereof, generates an output voltage $V_{OUT}$ of DC (direct current) stabilized to a predetermined target voltage, and supplies the output voltage $V_{OUT}$ to a load connected between an output terminal P2 and a ground terminal P3 (not illustrated). A switching transistor M1 is connected to a primary winding W1 of a transformer T1, and a diode D1 is connected to a secondary winding W2. An output capacitor C1 is connected to the output terminal P2.

A feedback circuit (also referred to as a shunt regulator circuit) 206 drives a light emitting element of a photocoupler 204 with an electric current $I_{ERR}$ corresponding to an error between the output voltage $V_{OUT}$ and its target voltage $V_{OUT(REF)}$. A feedback current $I_{FB}$ corresponding to the error flows in a light receiving element of the photocoupler 204. A feedback signal $V_{FB}$ corresponding to the feedback current $I_{FB}$ is generated at a feedback (FB) pin of a primary controller 202. The primary controller 202 generates a pulse signal having a duty ratio (or a frequency) corresponding to the feedback signal $V_{FB}$, and drives the switching transistor M1.

In the diode rectification-type flyback converter of FIG. 1A, a power loss of $Vf \times I_{OUT}$ is generated in the diode D1. Vf is a forward voltage, and $I_{out}$ is a load current. When Vf=0.5 V and $I_{OUT}$=10 A are assumed, a power loss is 5 W. Thus, a heat dissipation plate or a heat sink configured to cool the diode D1 is required in many applications.

The flyback converter 200S of FIG. 1B includes a synchronous rectification transistor M2 and a synchronous rectification controller (also referred to as a synchronous rectification IC) 300S in place of the diode D1 of FIG. 1A. The synchronous rectification controller 300S switches the synchronous rectification transistor M2 in synchronization with the switching of the switching transistor M1 on the primary side.

In the synchronous rectification-type flyback converter, a loss of the synchronous rectification transistor M2 is $R_{ON} \times I_{OUT}^2$. $R_{ON}$ is an ON-resistance of the synchronous rectification transistor M2, and the loss becomes 0.5 W and is more greatly reduced than in the diode rectification-type when $R_{ON}$=5 mΩ and $I_{OUT}$=10 A are assumed. Therefore, theoretically, the heat dissipation plate or the heat sink is unnecessary or can be simplified in the synchronous rectification-type.

The inventors of the present application have conducted studies regarding the synchronous rectification-type converter of FIG. 1B, and as a result, has recognized the following problem.

The flyback converter 200S is provided with a protection circuit such as an over-voltage protection (OVP) circuit 390 in order to enhance reliability. For example, the OVP circuit 390 is built in the feedback circuit 206 and supplies a current $I_{OVP}$ to the light emitting element of the photocoupler 204 in an over-voltage state.

FIG. 2 is an operation waveform diagram of the flyback converter 200S of FIG. 1B. The flyback converter 200S is in a normal state before time t0, and the output voltage $V_{OUT}$ is stabilized at its target value $V_{OUT(REF)}$. At time t0, a certain abnormality occurs, and the output voltage $V_{OUT}$ deviates from the target value $V_{OUT(REF)}$ and starts to rise.

When the output voltage $V_{OUT}$ exceeds an over-voltage threshold value $V_{OVP}$ at time $t_1$, the OVP circuit 390 is turned into a state of supplying the current $I_{OVP}$ to the light emitting element of the photocoupler 204 and is fixed (latched) in such a state. As a result, the feedback current $I_{FB}$ increases, the feedback signal $V_{FB}$ decreases, and the switching of the switching transistor M1 stops.

When the switching of the switching transistor M1 stops, the charging of the output capacitor C1 stops so that the output voltage $V_{OUT}$ gradually decreases with time. The feedback circuit 206 receives the output voltage $V_{OUT}$ as a power supply voltage $V_{CC}$. Therefore, when the output voltage $V_{OUT}$ decreases, the OVP circuit 390 becomes inoperable and hardly maintains the current $I_{OVP}$. For example, an under-voltage lockout (UVLO) circuit (not illustrated) is built in the feedback circuit 206, and is configured to reset an OVP state of the feedback circuit 206 when $V_{CC} < V_{UVLO}$ is established.

When the current low (and the current $I_{FRR}$) becomes zero at time $t_2$ due to the decrease of the output voltage $V_{OUT}$, that is, the power supply voltage $V_{CC}$, the feedback current $I_{FB}$ also becomes zero, the feedback signal $V_{FB}$ rises, and the switching of the switching transistor M1 restarts. The restart of switching causes the output voltage $V_{OUT}$ to start rising again.

When an over-voltage factor remains, the output voltage $V_{OUT}$ reaches the over-voltage threshold value $V_{OVP}$ again. The flyback converter 200S alternately repeats the operation and stop in a time-division manner (referred to as an intermittent mode).

There is a case where heat generation of circuit elements constituting the flyback converter 200S, more specifically, the synchronous rectification transistor M2 and the switching transistor M1 becomes a problem. In the intermittent mode of FIG. 2, heat is generated during an operation period so that temperature rises, and the temperature is relaxed during a stop period. Therefore, the temperature of the circuit element steadily rises when the stop period is short.

Although the over-voltage protection has been described here, the same problem may occur even for other protection circuits.

SUMMARY OF THE INVENTION

The invention has been made in view of the above problems, and one of exemplary general purposes of an embodiment is to provide a DC/DC converter that suppresses heat generation.

One embodiment of the invention relates to an isolated synchronous rectification-type DC/DC converter. The DC/DC converter includes: a transformer which has a primary winding and a secondary winding; a switching transistor which is connected to the primary winding of the transformer; an output capacitor which is charged by a current flowing in the secondary winding of the transformer; a photocoupler which includes a light emitting element and a light receiving element; a feedback circuit which drives the light emitting element of the photocoupler such that a detection voltage corresponding to an output voltage generated in the output capacitor approximates to a reference voltage; a primary controller which is connected to the light receiving element of the photocoupler and controls the switching transistor corresponding to a feedback signal based on a state of the light receiving element; a protection circuit which is activated and drives the light emitting element when detecting an abnormal state; and an auxiliary power supply circuit which includes a power supply capacitor provided separately from the output capacitor and supplies a power supply voltage generated in the power supply capacitor to the protection circuit and an anode of the light emitting element of the photo coupler.

According to this embodiment, the power supply voltage of the protection circuit is maintained even after an output voltage $V_{OUT}$ decreases, and thus, it is possible to maintain a driven state of the light emitting element for a long time. Accordingly, it is possible to increase thermal relaxation time at the time of operating in an intermittent mode and to suppress heat generation.

The protection circuit may include an abnormality detection circuit which maintains an asserted state of an abnormality detection signal until being reset when detecting an abnormal state, and a transistor which is turned into an on-state in the asserted state of the abnormality detection signal, and the power supply voltage may be supplied to the abnormality detection circuit.

The abnormality detection signal may be negated when the power supply voltage falls below a release threshold value.

The abnormality detection signal may be negated after a lapse of a predetermined time from assertion thereof.

The protection circuit may be an over-voltage protection circuit.

The auxiliary power supply circuit may further include a charging path from the output capacitor to the power supply capacitor.

The charging path may include a rectifier element that allows a current from an output line of the DC/DC converter to the power supply capacitor and blocks a current in the reverse direction.

The charging path may include a diode provided so as to have an anode on the output line side of the DC/DC converter and a cathode on the power supply capacitor side.

2.1 Another embodiment of the invention relates to a secondary controller used in an isolated synchronous rectification-type DC/DC converter. The secondary controller includes: a control output pin connected to a light emitting element of a photocoupler; a power supply pin that needs to receive a power supply voltage; a control input pin that needs to receive a detection voltage corresponding to an output voltage of the DC/DC converter; a feedback circuit which amplifies an error between the detection voltage and a reference voltage and supplies a current corresponding to the error to the light emitting element of the photocoupler; and a power supply path configured to supply power from the control output pin to the power supply pin.

According to this embodiment, a voltage of the control output pin is supplied to a power supply line of the secondary controller via the power supply path even if an open abnormality occurs in the power supply pin, and thus, the secondary controller can keep operating with the supplied voltage as the power supply voltage. Accordingly, it is possible to enhance the reliability.

The power supply path may include a rectifier element. The power supply path may include a diode provided so as to have an anode on the control output pin side and a cathode on the power supply pin side.

The secondary controller may further include a protection circuit which drives the light emitting element when detecting an abnormal state. The power supply voltage of the power supply pin may be supplied to at least a part of the protection circuit.

Accordingly, it is possible to prevent a loss of a protection function using the protection circuit when the open abnormality occurs in the power supply pin.

The protection circuit may be configured to be activated and to drive the light emitting element when detecting an over-voltage state. The power supply voltage supplied to the power supply pin may decrease slower than the output voltage in a stop state of the DC/DC converter.

When an over-voltage state occurs, the light emitting element is driven, switching on a primary side stops, and the output voltage decreases. When the output voltage decreases, the driving of the light emitting element by the protection circuit is released. Then, the switching on the primary side restarts. If the over-voltage state continues, the DC/DC converter transitions to an intermittent operation mode.

Here, the power supply voltage of the power supply pin is maintained even after the output voltage decreases, and thus, it is possible to maintain a driven state of the light emitting element for a long time. That is, it is possible to increase a stop period of the DC/DC converter. Accordingly, it is possible to increase thermal relaxation time at the time of operating in an intermittent mode and to suppress heat generation.

The protection circuit may include an over-voltage detection comparator which asserts an abnormality detection signal when detecting an over-voltage state, a latch circuit which latches the abnormality detection signal, and a protection transistor which is connected to the light emitting element and is turned into an on-state according to an output of the latch circuit.

The feedback circuit may include an error amplifier which amplifies the error between the detection voltage and the reference voltage and a pass transistor which is connected to the control output pin and is driven according to an output signal of the error amplifier.

The secondary controller may be accommodated in the same package as a synchronous rectification controller that drives a synchronous rectification transistor on a secondary side of the DC/DC converter.

Another embodiment of the invention relates to a DC/DC converter. The DC/DC converter includes any of the above-described secondary controllers.

2.2 Still another embodiment of the invention also relates to an isolated synchronous rectification-type DC/DC converter. This DC/DC converter includes: a transformer which has a primary winding and a secondary winding; a switching transistor which is connected to the primary winding of the transformer; an output capacitor which is charged by a current flowing in the secondary winding of the transformer; a photocoupler which includes a light emitting element and a light receiving element; a feedback circuit which drives the light emitting element of the photocoupler such that a detection voltage corresponding to an output voltage of the output capacitor approximates to a reference voltage; a primary controller which is connected to the light receiving element of the photo coupler and controls the switching transistor corresponding to a feedback signal based on a state of the light receiving element; a synchronous rectification controller which drives a synchronous rectification transistor; a protection circuit which is activated and drives the light emitting element when detecting an abnormal state; an auxiliary power supply circuit which includes a power supply capacitor provided separately from the output capacitor and supplies a power supply voltage generated in the power supply capacitor to at least a part of a power supply line of the protection circuit; and a rectifier element which is provided between a cathode of the light emitting element of the photocoupler and the power supply line.

According to this embodiment, a voltage is supplied from the cathode of the light emitting element of the photocoupler to the power supply line via the rectifier element even if a power supply path from the auxiliary power supply circuit to the power supply line is cut off, and thus, it is possible to maintain the operation of the protection circuit. Accordingly, it is possible to enhance the reliability.

The power supply voltage may decrease slower than the output voltage in a stop state of the DC/DC converter.

Accordingly, it is possible to extend a length of a stop period of an intermittent operation.

The power supply voltage from the auxiliary power supply circuit may be supplied to an anode of the light emitting element of the photocoupler.

Accordingly, it is possible to lower the output voltage during the stop period to 0 V or the vicinity of 0 V during the intermittent operation in an abnormal state.

The rectifier element may be a diode.

The protection circuit may include an abnormality detection circuit which maintains assertion of an abnormality detection signal until being reset when detecting the abnormal state, and a transistor which is turned into an on-state in an asserted state of the abnormality detection signal. The power supply voltage may be supplied to the abnormality detection circuit.

The abnormality detection signal may be negated when the power supply voltage falls below a release threshold value.

The abnormality detection signal may be negated after a lapse of a predetermined time from assertion thereof.

The protection circuit may be an over-voltage protection circuit. The abnormality detection circuit may include a hysteresis comparator.

The auxiliary power supply circuit may further include a charging path from the output capacitor to the power supply capacitor. The charging path may include a rectifier element that allows a current from an output line of the DC/DC converter to the power supply capacitor and blocks a current in the reverse direction.

The charging path may include a diode provided so as to have an anode on the output line side of the DC/DC converter and a cathode on the power supply capacitor side.

The synchronous rectification controller, the feedback circuit, and the protection circuit may be accommodated in one package.

The feedback circuit and the protection circuit may be integrated on the same chip.

The expression "integrated" includes a case where all components of circuits are formed on a semiconductor substrate and a case where main components of the circuits are integrally integrated, and some resistors, capacitors, and the like may be provided outside the semiconductor substrate for control of a circuit constant. As the circuits are integrated one chip, it is possible to reduce the circuit area and to keep characteristics of circuit elements uniform.

The synchronous rectification controller, the feedback circuit, and the protection circuit may be integrated on the same chip.

Another embodiment of the invention relates to an electronic device. The electronic device may include: a load; a diode rectifier circuit which performs full-wave rectification of a commercial AC (alternating current) voltage; a smoothing capacitor which smoothes an output voltage of the diode rectifier circuit to generate a DC input voltage; and any of the above-described DC/DC converters which steps down the DC input voltage and supplies the stepped-down DC input voltage to the load.

Another aspect of the invention relates to a power adapter. The power adapter may include: a diode rectifier circuit which performs full-wave rectification of a commercial AC voltage; a smoothing capacitor which smoothes an output voltage of the diode rectifier circuit to generate a DC input voltage; and any of the above-described DC/DC converters which steps down the DC input voltage and supplies the stepped-down DC input voltage to the load.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

Further, the description of this section (Means for Solving the Problem) does not intend to describe all the essential features, and accordingly, the invention may include sub-combinations of these features to be described.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1B:
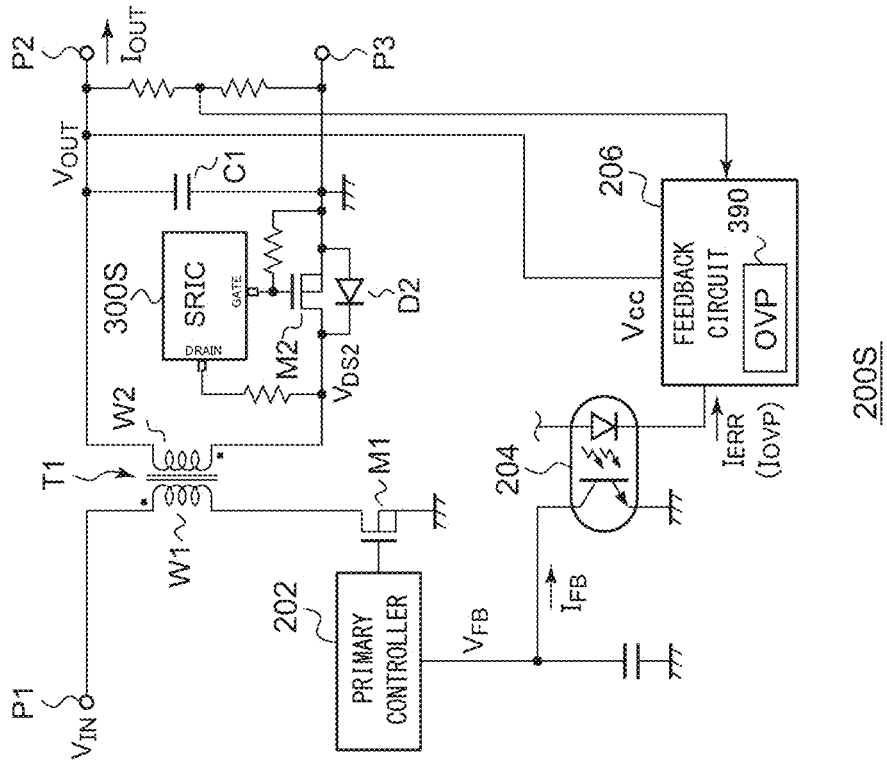
FIGS. 1A and 1B are circuit diagrams of a flyback converter.
Figure 1A:
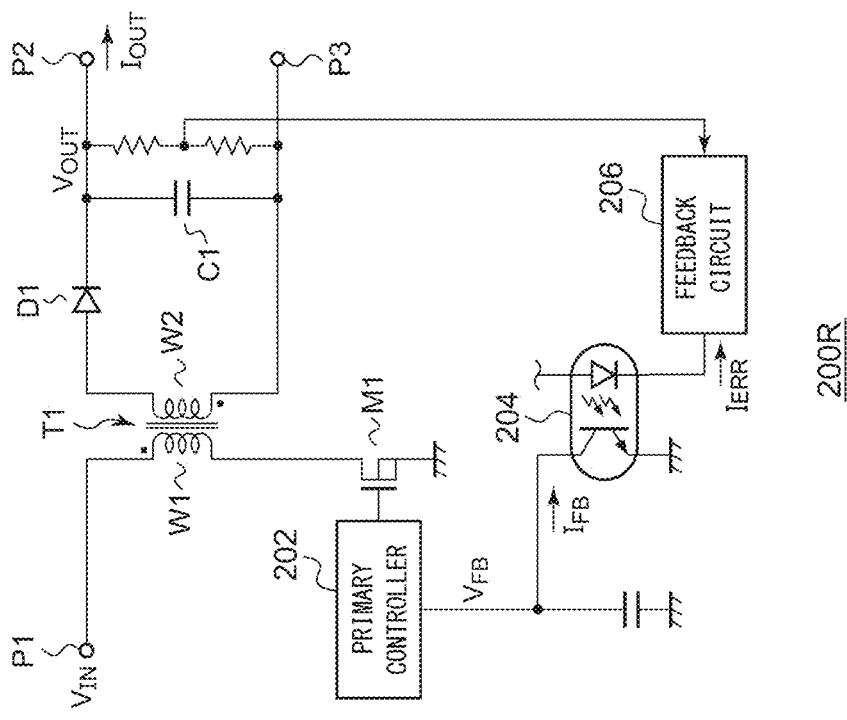

The invention will now be described based on preferred embodiments which do not intend to limit the scope of the present invention but exemplify the invention. All of the features and the combinations thereof described in the embodiment are not necessarily essential to the invention.

In the present specification, a "state where a member A is connected to a member B" includes not only a state where the member A is physically and directly connected to the member B but also a state where the member A is indirectly connected to the member B via another member that does not affect such an electrical connection state or does not impair functions thereof.

Similarly, a "state where a member C is provided between a member A and a member B" includes not only a state where the member A is directly connected to the member C, or the member B is directly connected to the member C but also a state where the member A is indirectly connected to the member C or the member B is indirectly connected to the member C via another member that does not affect such an electrical connection state, or that does not impair functions thereof.

The vertical axis and the horizontal axis in waveform diagrams and time charts referred to in the present specification are expanded or reduced as appropriate for ease of understanding. In addition, each waveform illustrated in the drawings is simplified, exaggerated, or emphasized for ease of understanding.

First Embodiment

Figure 3:
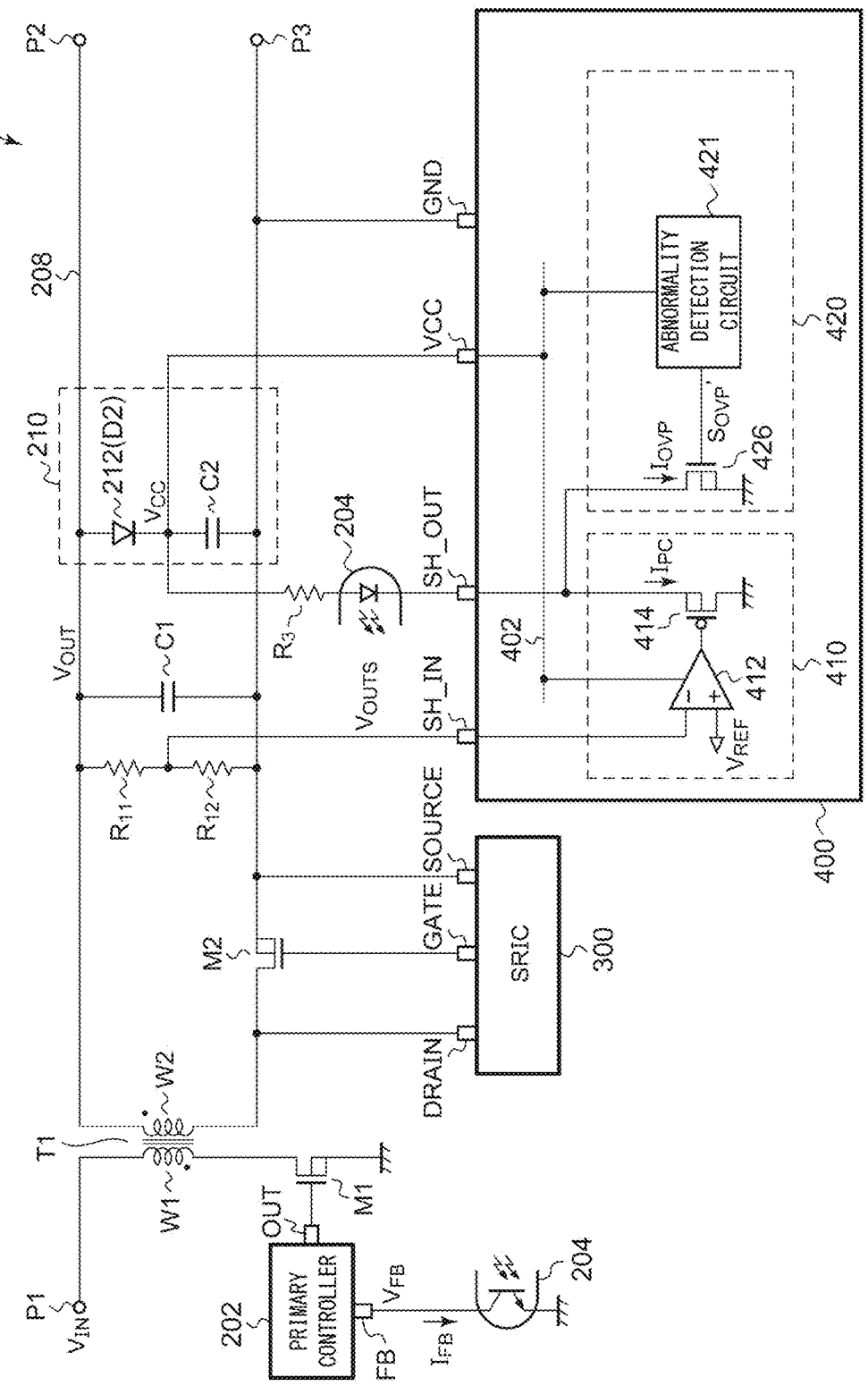
FIG. 3 is a circuit diagram of an isolated DC/DC converter according to a first embodiment.

FIG. 3 is a circuit diagram of an isolated DC/DC converter 200 according to a first embodiment. The DC/DC converter 200 is a flyback converter, receives an input voltage $V_{IN}$ at an input terminal P1 thereof, generates an output voltage $V_{OUT}$ of direct current stabilized to a predetermined target voltage, and supplies the output voltage $V_{OUT}$ to a load connected between an output terminal P2 and a ground terminal P3 (not illustrated).

A transformer T1 has a primary winding W1 and a secondary winding W2. One end of the primary winding W1 is connected to the input terminal P1 and receives the DC input voltage $V_{IN}$. A drain of the switching transistor M1 is connected to the other end of the primary winding W1 of the transformer T1. A sense resistor for current detection may be inserted between a source of the switching transistor M1 and a ground line.

A synchronous rectification transistor M2 and the secondary winding W2 of the transformer T1 are provided in series between the output terminal P2 and the ground terminal P3. An output capacitor C1 is connected between the output terminal P2 and the ground terminal P3.

A primary controller 202 is connected to a light receiving element of a photocoupler 204. A feedback signal $V_{FB}$ corresponding to a feedback current $I_{FB}$ flowing in the light receiving element of the photocoupler 204 appears at a feedback (FB) terminal of the primary controller 202.

The primary controller 202 generates a pulse signal having a duty ratio (or a frequency) corresponding to the feedback signal $V_{FB}$, outputs the pulse signal from an output (OUT) terminal, and drives the switching transistor M1. A configuration and a control system of the primary controller 202 are not particularly limited. For example, the primary controller 202 may be a modulator of a current mode.

A synchronous rectification controller 300 controls the synchronous rectification transistor M2. For example, the synchronous rectification controller 300 generates a control pulse based on a drain-source voltage $V_{DS2}$ of the synchronous rectification transistor M2 and supplies a gate pulse corresponding to the control pulse to a gate of the synchronous rectification transistor M2. A configuration and an operation of the synchronous rectification controller 300 are not particularly limited, either, and a well-known technique may be used.

A secondary controller 400 includes a control input (SH_IN) pin, a control output (SH_OUT) pin, a power supply (VCC) pin, and a ground (GND) pin, which are accommodated in one package. A detection voltage $V_{OUTS}$ corresponding to the output voltage $V_{OUT}$ is input to the SH_IN pin. For example, the detection voltage $V_{OUTS}$ is a voltage obtained by dividing the output voltage $V_{OUT}$ by resistors $R_{11}$ and $R_{12}$. The SH_OUT pin is connected to a light emitting element of the photocoupler 204. The GND pin is connected to the ground terminal P3 (ground line).

An auxiliary power supply circuit 210 is provided on a secondary side of the DC/DC converter 200. The auxiliary power supply circuit 210 includes a power supply capacitor C2 provided separately from the output capacitor C1, and a power supply voltage $V_{CC}$ generated in the power supply capacitor C2 is supplied to the VCC pin of the secondary controller 400. The auxiliary power supply circuit 210 includes a charging path 212 provided between the auxiliary power supply circuit 210 and the power supply capacitor C2. The charging path 212 may include a rectifier element that allows a current from an output line 208 of the DC/DC converter 200 to the power supply capacitor C2 and blocks a current in the reverse direction. The rectifier element may include a diode D2 provided so as to have an anode on the output line 208 side of the DC/DC converter 200 and a cathode on the power supply capacitor C2 side. Alternatively, the rectifier element may be a switch (transistor).

The power supply capacitor C2 is charged to substantially the same potential as the output voltage $V_{OUT}$ during the operation of the DC/DC converter 200, and accordingly, the power supply voltage $V_{CC}$ having substantially the same potential as the output voltage $V_{OUT}$ is supplied to the VCC pin.

In addition, an anode of the light emitting element of the photocoupler 204 is connected to the power supply capacitor C2 via a resistor $R_3$. That is, the power supply voltage $V_{CC}$ from the auxiliary power supply circuit 210 is supplied to the light emitting element.

When the switching operation of the DC/DC converter 200 stops, the output capacitor C1 is discharged by a load current, and a voltage thereof decreases with time. In contrast, the power supply capacitor C2 is discharged by a forward current of the photocoupler 204 and a current flowing in the VCC pin of the secondary controller 400. The capacity of the power supply capacitor C2 is determined such that the power supply voltage $V_{CC}$ decreases slower than the output voltage $V_{OUT}$ in a stop state of the DC/DC converter 200.

The secondary controller 400 includes a power supply line 402, a feedback circuit 410, and a protection circuit 420, which are integrated one semiconductor substrate. The power supply line 402 is connected to the VCC pin. The feedback circuit 410 and the protection circuit 420 operate by receiving the power supply voltage $V_{CC}$ of the power supply line 402.

The feedback circuit 410 is a so-called shunt regulator, and drives the light emitting element of the photocoupler 204 such that the detection voltage $V_{OUTS}$ approximates to a reference voltage $V_{REF}$, in other words, the output voltage $V_{OUT}$ approximates to its target value $V_{OUT(REF)}$. Specifically, the feedback circuit 410 drives the light emitting element of the photocoupler 204 by a current $I_{PC}$ corresponding to an error between the detection voltage $V_{OUTS}$ and the reference voltage $V_{REF}$.

For example, the feedback circuit 410 includes an error amplifier 412 and a pass transistor 414. The error amplifier 412 amplifies the error between the detection voltage $V_{OUTS}$ and the reference voltage $V_{REF}$. The pass transistor 414 is, for example, a P-channel MOSFET, and has a source connected to the SH_OUT pin and a gate connected to an output of the error amplifier 412. An output signal of the error amplifier 412, that is, the current $I_{PC}$ corresponding to the error between the detection voltage $V_{OUTS}$ and the reference voltage $V_{REF}$ flows to the pass transistor 414. The pass transistor 414 may be an N-channel MOSFET. In addition, the pass transistor 414 may be an NPN-type or a PNP-type bipolar transistor.

A power supply of the error amplifier 412 may be taken from the SH_OUT pin. In this case, the protection circuit 420 is supplied with power from the power supply line 402.

When detecting an abnormal state, the protection circuit 420 supplies a current to the light emitting element of the photocoupler 204. When an abnormality occurs, the forward current flowing in the light emitting element of the photocoupler 204 increases, the feedback current $I_{FB}$ increases, the feedback voltage $V_{FB}$ decreases, and the switching of the switching transistor M1 stops, whereby the circuit is protected.

Although not particularly limited, the abnormal state is an over-voltage state in the present embodiment, and the protection circuit 420 is an OVP circuit that supplies a current low to the photocoupler 204 when detecting an over-voltage state.

The protection circuit 420 includes an abnormality detection circuit 421 and a protection transistor 426. When detecting the abnormal state (in this case, the over-voltage state), the abnormality detection circuit 421 maintains an asserted state of an abnormality detection signal $S_{OVP}'$ until being reset. The protection transistor 426 is turned into an on-state in the asserted state of the abnormality detection signal $S_{OVP}'$.

The configuration of the DC/DC converter 200 has been described as above. Next, an operation thereof will be described.

Figure 4:
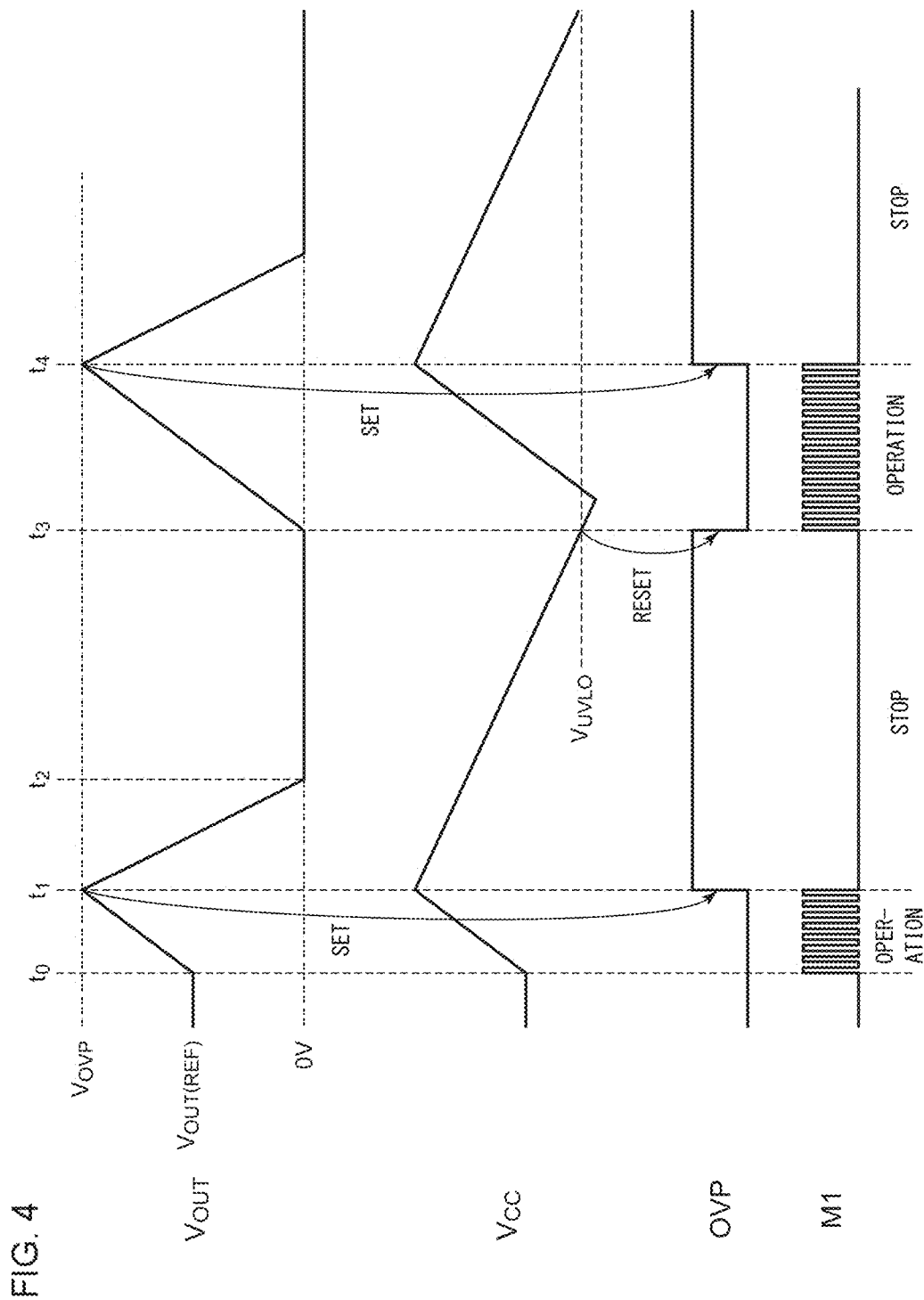
FIG. 4 is an operation waveform diagram of the DC/DC converter of FIG. 3.

FIG. 4 is an operation waveform diagram of the DC/DC converter 200 of FIG. 3. The DC/DC converter 200 is in a normal state before time $t_0$, and the output voltage $V_{OUT}$ is stabilized at its target value $V_{OUT(REF)}$. At time $t_0$, a certain abnormality occurs, and the output voltage $V_{OUT}$ deviates from the target value $V_{OUT(REF)}$ and starts to rise. The power supply voltage $V_{CC}$ rises as the output voltage $V_{OUT}$ rises.

Further, when the output voltage $V_{OUT}$ exceeds an over-voltage threshold value $V_{OVP}$ at time $t_1$, the protection circuit 420 is turned into a state of supplying the current $I_{OVP}$ to the light emitting element of the photocoupler 204 and is fixed (latched) in such a state. As a result, the feedback current $I_{FB}$ increases, the feedback signal $V_{FB}$ decreases, and the switching of the switching transistor M1 stops.

Since the switching of the output capacitor C1 stops when the switching of the switching transistor M1 stops, the output voltage $V_{OUT}$ gradually decreases with time, and the power supply voltage $V_{CC}$ supplied to the secondary controller 400 also gradually decreases. The output voltage $V_{OUT}$ decreases to 0 V at time $t_2$. In contrast, the power supply voltage $V_{CC}$ decreases slower than the output voltage $V_{OUT}$.

When a voltage $V_{CC}'$ of the VCC pin of the secondary controller 400 decreases to a release threshold value $V_{UVLO}$ at time $t_3$, a protection state of the protection circuit 420 is released, and $I_{OVP}$ becomes zero. As a result, the feedback current $I_{FB}$ also becomes zero, the feedback signal $V_{FB}$ rises, and the switching of the switching transistor M1 restarts. The output voltage $V_{OUT}$ rises again due to the restart of switching, and the power supply voltage $V_{CC}$ also rises.

When an over-voltage factor remains, the output voltage $V_{OUT}$ rises above the target voltage $V_{OUT(REF)}$ again. Further, when the output voltage $V_{OUT}$ exceeds the over-voltage threshold value $V_{OVP}$, the protection state is formed again. The DC/DC converter 200 alternately repeats the operation and stop in a time-division manner while the over-voltage factor continues.

The operation of the DC/DC converter 200 has been described as above. According to the DC/DC converter 200, a stop period in an intermittent mode can be made longer than that in the flyback converter 200S in FIG. 1B. As described above, circuit elements generate heat during an operation period so that temperature rises, and the temperature is relaxed during the stop period. Meanwhile, it is possible to suppress the temperature rise of the circuit element by increasing the stop period.

Another advantage of the DC/DC converter 200 will be clarified through comparison with a comparison technique. In the comparison technique, a VCC pin of a secondary controller 400 is connected to an output line 208, and an output voltage $V_{OUT}$ is used as a power supply voltage.

Figure 5:
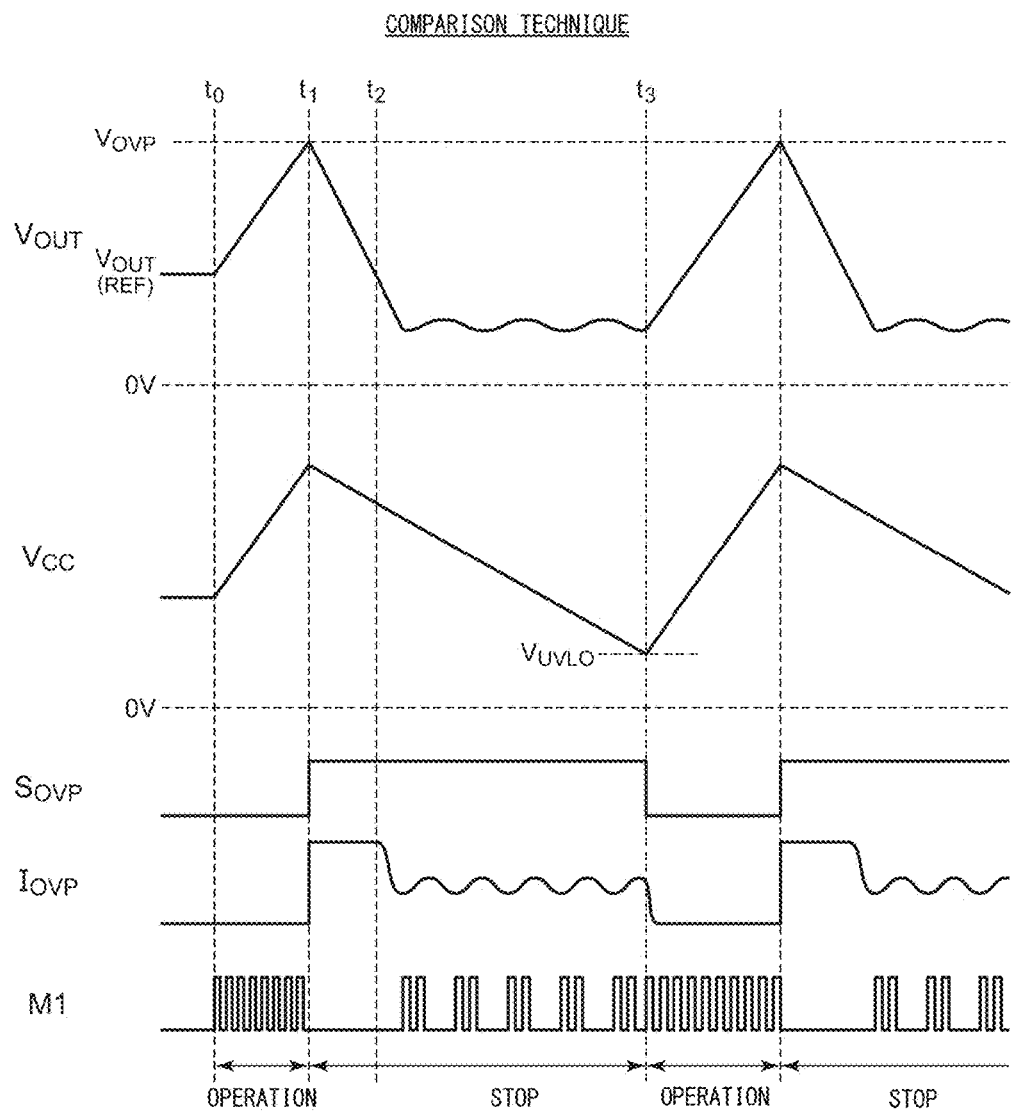
FIG. 5 is an operation waveform diagram of a DC/DC converter according to a comparison technique.

An operation of the comparison technique will be described. FIG. 5 is an operation waveform diagram of a DC/DC converter according to the comparison technique.

At time $t_0$, a certain abnormality occurs, and an output voltage $V_{OUT}$ deviates from a target value $V_{OUT(REF)}$ and starts to rise. A power supply voltage $V_{CC}$ rises as the output voltage $V_{OUT}$ rises.

Further, when the output voltage $V_{OUT}$ exceeds an over-voltage threshold value $V_{OVP}$ at time $t_1$, a protection circuit 420 is turned into a state of supplying a current $I_{OVP}$ to a light emitting element of a photocoupler 204 and is fixed (latched) in such a state. As a result, a feedback current $I_{FB}$ increases, a feedback signal $V_{FB}$ decreases, and the switching of a switching transistor M1 stops.

Since the switching of an output capacitor C1 stops when the switching of the switching transistor M1 stops, the output voltage $V_{OUT}$ gradually decreases with time, and the power supply voltage $V_{CC}$ supplied to a secondary controller 400 also gradually decreases. The power supply voltage $V_{CC}$ decreases slower than the output voltage $V_{OUT}$.

When the output voltage $V_{OUT}$, that is, a cathode voltage of the light emitting element of the photocoupler 204 decreases to a certain voltage level at time $t_2$, the protection current $I_{OVP}$ decreases, and luminance of the light emitting element decreases. Accordingly, the feedback current $I_{FB}$ decreases, the feedback voltage $V_{FB}$ rises, and the switching transistor M1 is switched. When the output voltage $V_{OUT}$ rises slightly due to the switching of the switching transistor M1, the protection current $I_{OVP}$ slightly increases, the switching of the switching transistor M1 stops, or the duty ratio of the switching thereof decreases.

In this manner, the output voltage $V_{OUT}$ does not completely decrease to 0 V in a stop section in the over-voltage state, but is in an equilibrium state at a certain voltage level, and the switching of the switching transistor M1 does not completely stop, either, in the comparison technique. The operation of the comparison technique has been described as above.

According to the DC/DC converter 200 according to the embodiment, the light emission of the light emitting element of the photocoupler 204 is maintained even when the output voltage $V_{OUT}$ decreases, and thus, it is possible to maintain a stop state of the switching transistor M1 as illustrated in FIG. 4.

An aspect of the invention extends to various apparatuses and circuits that are grasped as the block diagram and the circuit diagram of FIG. 3, or derived from the above description, and are not limited to specific configurations. Hereinafter, more specific configuration examples and modifications will be described in order not to narrow the scope of the invention but to aid understanding of the essence of the invention and the circuit operation and for the sake of clarification thereof.

First Configuration Example

Figure 6:
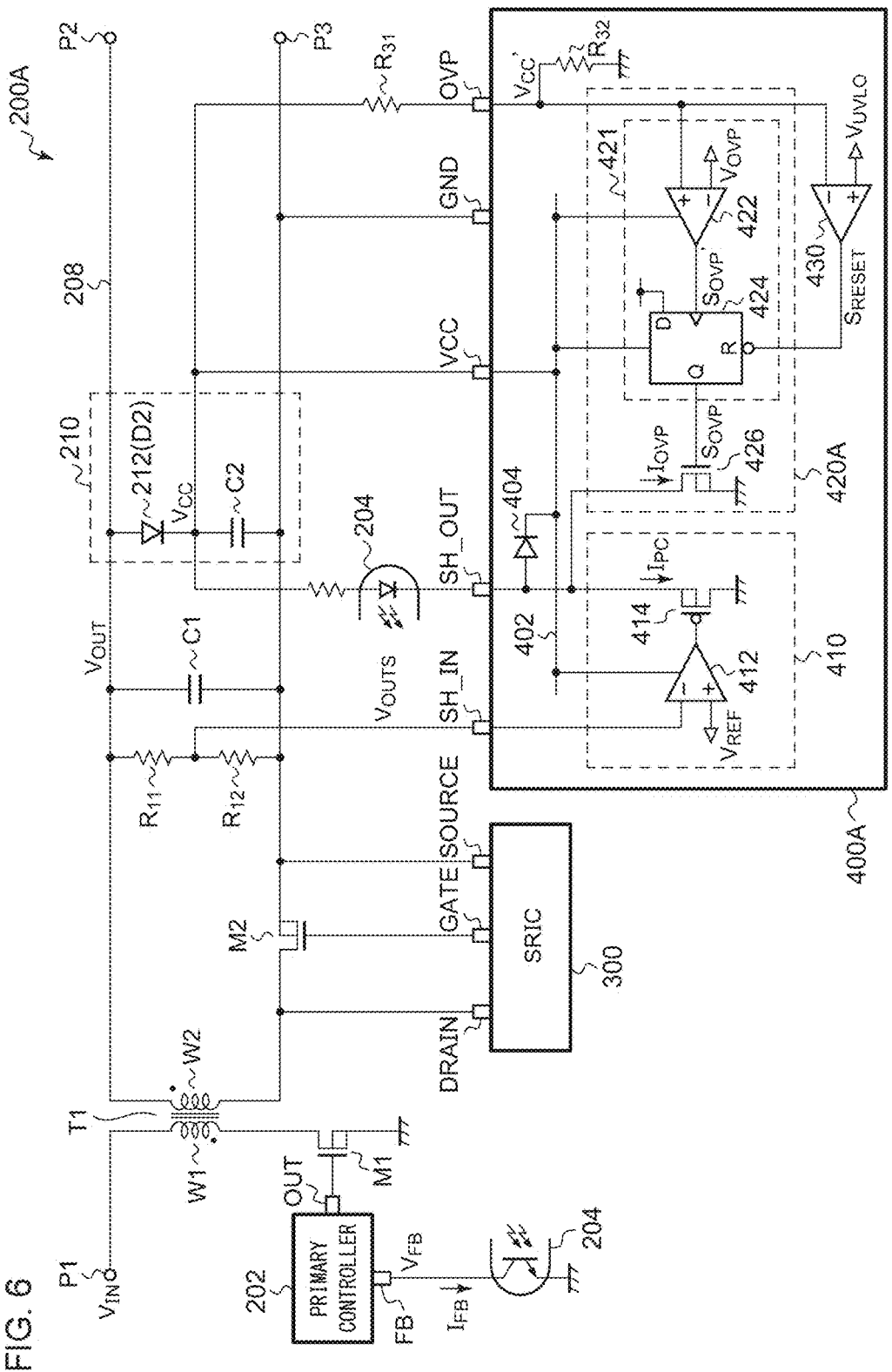
FIG. 6 is a circuit diagram illustrating a first configuration example of the DC/DC converter of FIG. 3.

FIG. 6 is a circuit diagram illustrating a first configuration example (200A) of the DC/DC converter.

A protection circuit 420A is an over-voltage protection (OVP) circuit. The power supply voltage $V_{CC}$ is supplied to an over-voltage protection (OVP) pin of a secondary controller 400A via a resistor $R_{31}$. The voltage $V_{CC}'$, obtained by dividing the power supply voltage $V_{CC}$ by an external resistor $R_{31}$ and a built-in resistor $R_{32}$ is generated at the OVP pin. The resistor $R_{32}$ may be an externally-attached part.

As described above, $V_{CC} \approx V_{OUT}$ during a switching operation of the DC/DC converter 200A, and thus, the voltage $V_{CC}'$ of the VCC pin is a voltage corresponding to the output voltage $V_{OUT}$. When the voltage $V_{CC}'$ of the OVP pin exceeds the predetermined over-voltage threshold value $V_{OVP}$, the protection circuit 420A generates the current $I_{OVP}$ and drives the photocoupler 204.

The protection circuit 420A is configured to maintain a drive state of the photocoupler 204 until being reset when the voltage $V_{CC}'$ of the OVP pin exceeds the predetermined over-voltage threshold value $V_{OVP}$.

The protection circuit 420A includes the abnormality detection circuit 421 and the protection transistor 426. When detecting the abnormal state (in this case, the over-voltage state), the abnormality detection circuit 421 maintains an asserted state of an abnormality detection signal $S_{OVP}$ until being reset. The protection transistor 426 is turned into the on-state in the asserted state of the abnormality detection signal $S_{OVP}$.

The abnormality detection circuit 421 includes the over-voltage detection comparator 422 and the latch circuit 424. The over-voltage detection comparator 422 compares the voltage $V_{CC}'$ of the OVP pin with the over-voltage threshold value $V_{OVP}$ and asserts a comparison signal $S_{OVP}'$ (for example, sets the comparison signal to a high level) when detecting the over-voltage state ($V_{CC}' > V_{OVP}$). The latch circuit 424 latches the comparison signal $S_{OVP}'$. The latch circuit 424 may include a flip-flop. The protection transistor 426 is connected to the light emitting element of the photocoupler 204 via the SH_OUT pin and is turned into the on-state according to an output $S_{OVP}$ of the latch circuit 424.

The secondary controller 400A may include an under-voltage lockout (UVLO) circuit 430. The UVLO circuit 430 is a reset circuit that asserts a release signal $S_{RESET}$ (for example, sets the release signal to a low level) and resets the latch circuit 424 when $V_{CC}' < V_{UVLO}$ is established. When the OVP state of the protection circuit 420A is released by the UVLO circuit 430, the protection transistor 426 is turned off, and the current $I_{OVP}$ stops flowing.

In the secondary controller 400A, the power supply voltage $V_{CC}$ is supplied to the feedback circuit 410 and the protection circuit 420A via the power supply line 402.

A power supply path 404 is configured so as to supply power in one direction from the SH_OUT pin to the VCC pin. For example, the power supply path 404 may include a rectifier element. The rectifier element includes a diode provided so as to have an anode on the SH_OUT pin side and a cathode on the VCC pin (power supply line 402) side.

Figure 7:
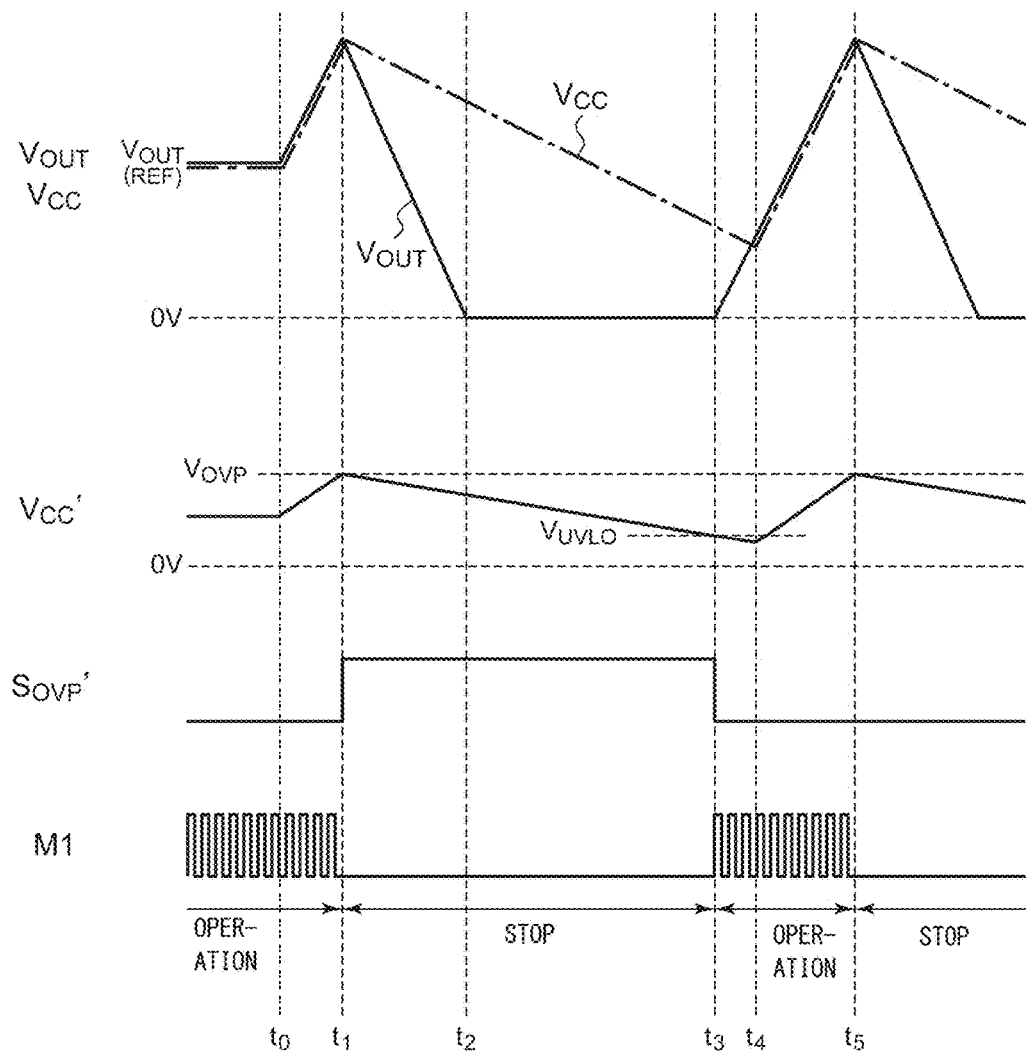
FIG. 7 is an operation waveform diagram of the DC/DC converter of FIG. 6.

The configuration of the DC/DC converter 200A has been described as above. Next, an operation thereof will be described. FIG. 7 is an operation waveform diagram of the DC/DC converter 200A of FIG. 6.

The DC/DC converter 200 is in a normal state before time $t_0$, and the output voltage $V_{OUT}$ is stabilized at its target value $V_{OUT(REF)}$. At time $t_0$, a certain abnormality occurs, and an output voltage $V_{OUT}$ deviates from a target value $V_{OUT(REF)}$ and starts to rise.

As the output voltage $V_{OUT}$ rises, the supply voltage $V_{CC}$ and the voltage $V_{CC}'$ of the OVP pin rise. Further, when the voltage $V_{CC}'$ exceeds the over-voltage threshold value $V_{OVP}$ at time $t_1$, the protection circuit 420 is turned into a state of supplying the current $I_{OVP}$ to the light emitting element of the photocoupler 204 and is fixed (latched) in such a state. As a result, a feedback current $I_{FB}$ increases, a feedback signal $V_{FB}$ decreases, and the switching of a switching transistor M1 stops.

Since the switching of an output capacitor C1 stops when the switching of a switching transistor M1 stops, the output voltage $V_{OUT}$ gradually decreases with time, and the power supply voltage $V_{CC}$ supplied to the secondary controller 400A also gradually decreases. The output voltage $V_{OUT}$ decreases to 0 V at time $t_2$. In contrast, the power supply voltage $V_{CC}$ decreases slower than the output voltage $V_{OUT}$.

When the voltage $V_{CC}'$ of the OVP pin decreases to the UVLO voltage $V_{UVLO}$ at time $t_3$, the protection state of the protection circuit 420A is released, and $I_{OVP}$ becomes zero. As a result, the feedback current $I_{FB}$ also becomes zero, the feedback signal $V_{FB}$ rises, and the switching of the switching transistor M1 restarts. The output voltage $V_{OUT}$ rises again due to the restart of switching, and the power supply voltage $V_{CC}$ also rises.

When an over-voltage factor remains, the output voltage $V_{OUT}$ rises above the target voltage $V_{OUT(REF)}$ again. Further, when the voltage $V_{CC}'$ of the OVP pin exceeds the over-voltage threshold value $V_{OVP}$, the protection state is formed again. The DC/DC converter 200A alternately repeats the operation and stop in a time-division manner while the over-voltage factor continues. The operation of the DC/DC converter 200A has been described as above.

According to the DC/DC converter 200A of FIG. 6, it is possible to prevent abnormal heat generation of the synchronous rectification transistor M2 by increasing a length of a stop period, and it is possible to enhance reliability.

Further, the voltage is supplied to the power supply line 402 from the SH_OUT pin via the power supply path 404 even when an open abnormality occurs in the VCC pin according to the DC/DC converter 200A. Accordingly, the feedback circuit 410 and the protection circuit 420A can continue the operation, and it is possible to enhance the reliability.

Modification

Figure 8A:
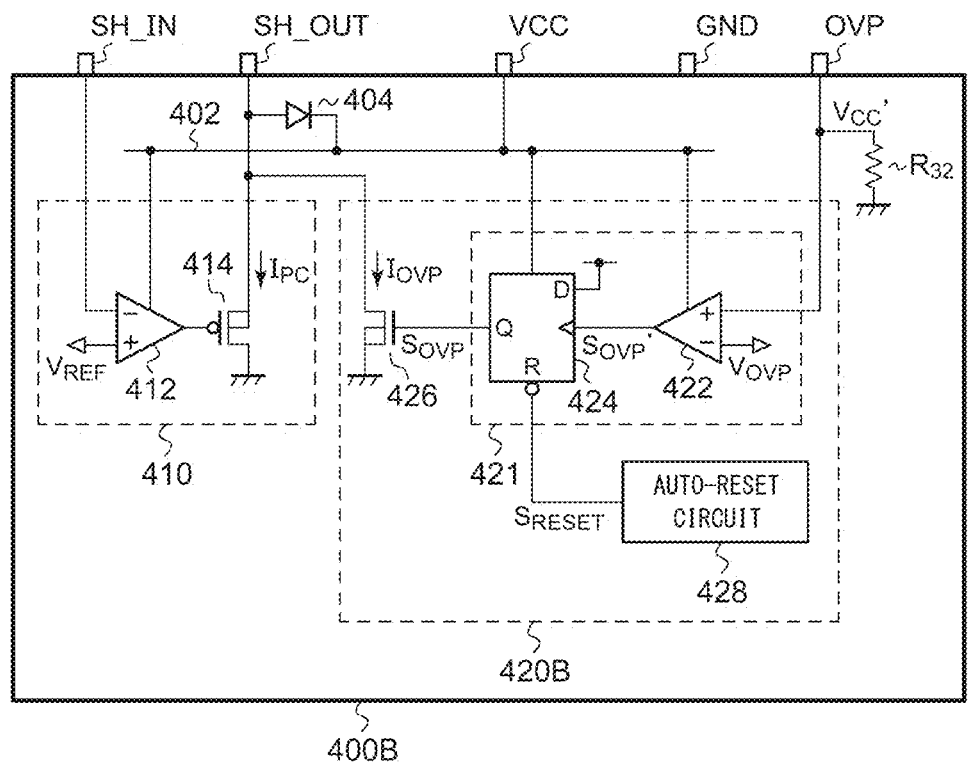
FIGS. 8A and 8B are circuit diagrams of a modification of a secondary controller of FIG. 3.
Figure 8B:
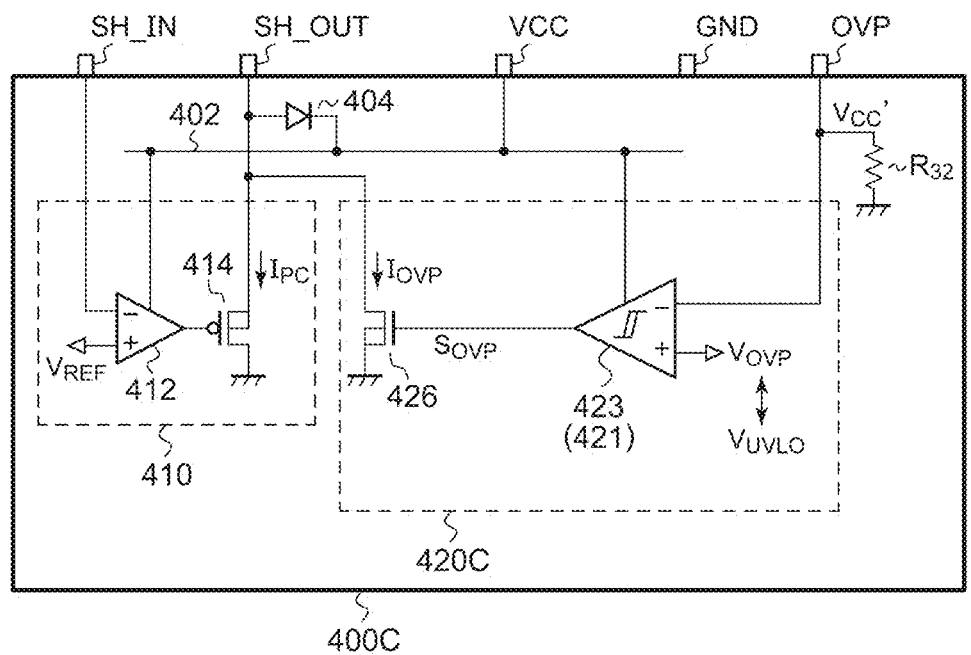

FIGS. 8A and 8B are circuit diagrams of modifications (400B and 400C) of the secondary controller of FIG. 3. In the secondary controller 400B of FIG. 8A, a protection circuit 420B includes an auto-reset circuit 428. The auto-reset circuit 428 also operates by receiving the voltage $V_{CC}$ of the power supply line 402.

The auto-reset circuit 428 includes a timer circuit, and resets the latch circuit 424 after a lapse of a predetermined time since the protection circuit 420B enters the OVP state. According to this modification, it is possible to set the stop period in accordance with the time measured by the auto-reset circuit 428.

In the secondary controller 400C of FIG. 8B, the protection circuit 420C includes a hysteresis comparator 423 and a protection transistor 426. The hysteresis comparator 423 compares the voltage $V_{CC}'$ of the OVP pin with a threshold voltage which changes between two values of $V_{OVP}$ and $V_{UVLO}$, and generates the abnormality detection signal $S_{OVP}$ corresponding to the comparison result. According to this configuration, the operation of FIG. 5 can be realized.

Second Configuration Example

Figure 9:
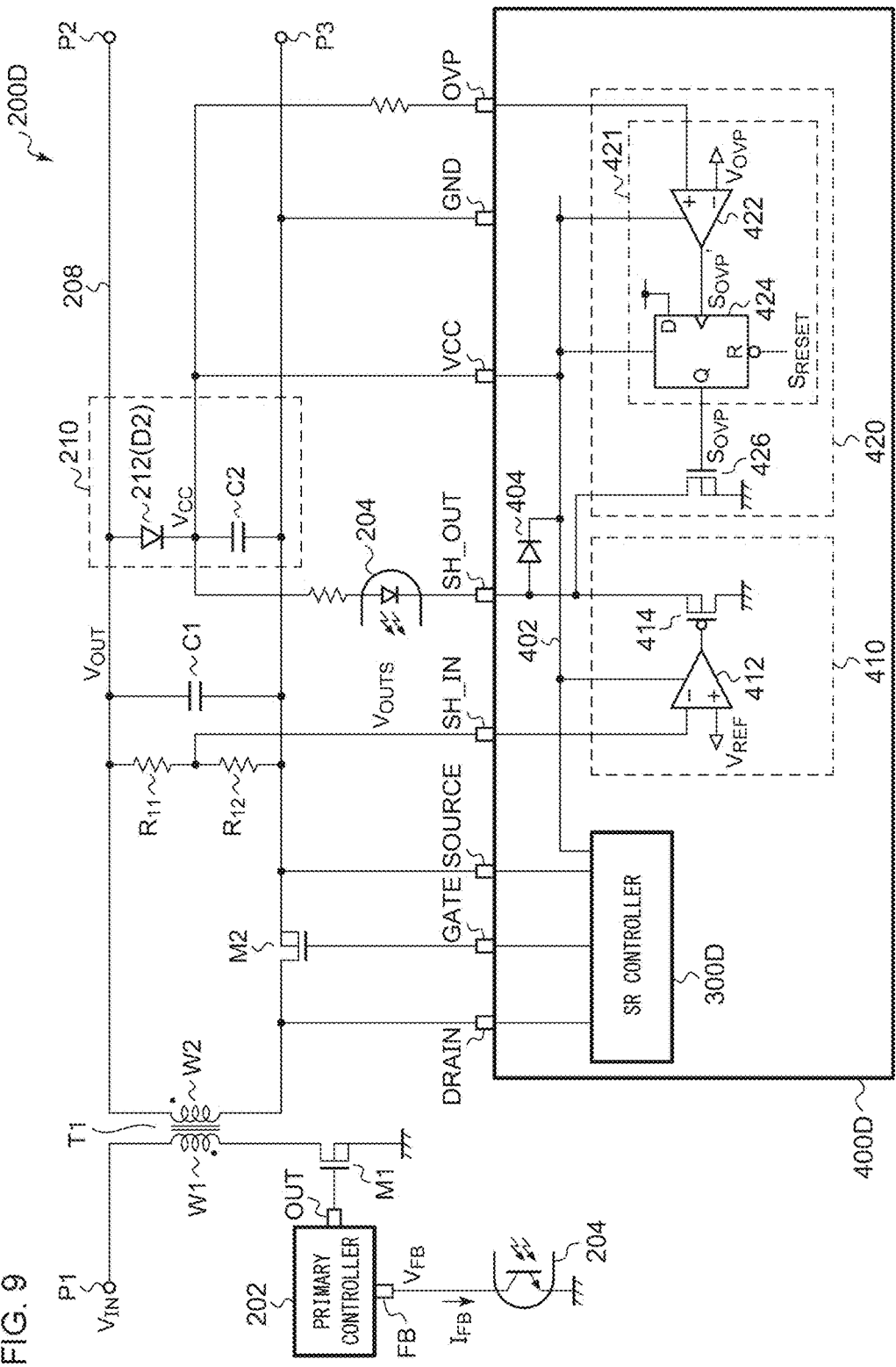
FIG. 9 is a circuit diagram illustrating a second configuration example of the DC/DC converter of FIG. 3.

FIG. 9 is a circuit diagram illustrating a second configuration example (200D) of the DC/DC converter. In the DC/DC converter 200D, not only the feedback circuit 410 and the protection circuit 420 but also a synchronous rectification controller 300D is accommodated in the same package in the secondary controller 400D. These parts may be integrated on the same semiconductor substrate (a die or a chip) or may be integrated in the state of being divided into a plurality of dies.

A SOURCE pin is a ground terminal of the synchronous rectification controller 300D. A GATE pin and a DRAIN pin are connected to a gate and a drain of the synchronous rectification transistor M2. The power supply voltage $V_{CC}$ is also supplied to the synchronous rectification controller 300D from the power supply line 402. The synchronous rectification controller 300D may be built in the secondary controllers 400B and 400C according to the modifications of FIGS. 8A and 8B.

Hereinafter, modifications relating to the first embodiment will be described.

First Modification

The protection circuit 420 is not limited to the over-voltage protection circuit. For example, the protection circuit 420 may detect a non-switchable state where the synchronous rectification transistor M2 is not switchable and be turned into an activated state in the non-switchable state, and drive the light emitting element of the photocoupler 204. For example, the protection circuit 420 may detect an open abnormality of a GATE pin of the secondary controller 400 or may detect an open abnormality of a DRAIN pin of the secondary controller 400.

Second Modification

Although the synchronous rectification-type flyback converter has been taken as an example in the embodiment, the invention is also applicable to a diode rectification-type flyback converter. In addition, the invention is also applicable to an LLC converter.

Third Modification

Figure 2:
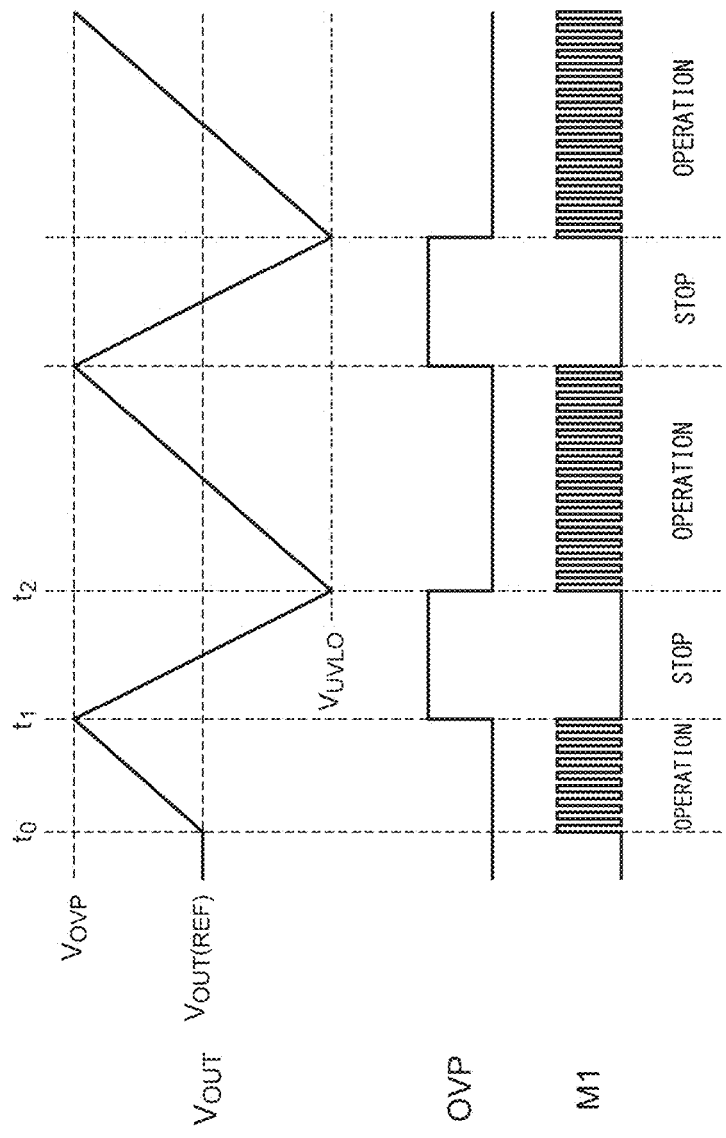
FIG. 2 is an operation waveform diagram of a DC/DC converter of FIG. 1B.

The configuration of the power supply path 404 is not limited to the diode as illustrated in FIG. 2, and may be configured using a switch that is turned on when a voltage of the SH_OUT pin is higher than a voltage of the VCC pin and turned off when the voltage of the SH_OUT pin is not higher than the voltage of the VCC pin.

Fourth Modification

The configuration of the auxiliary power supply circuit 210 is not limited to that illustrated in FIG. 3 or the like. For example, the auxiliary power supply circuit 210 may be configured using a step-up charge pump having the output voltage $V_{OUT}$ as an input, and an output voltage thereof may be supplied to the VCC pin.

Second Embodiment

A problem to be solved by a second embodiment will be described. The inventors of the present application have conducted studies regarding the flyback converter 200S of FIG. 1B, and as a result, has recognized the following problem. The output voltage $V_{OUT}$ (or the power supply voltage $V_{CC}$ originating therefrom) is supplied to the power supply (VCC) pin of the feedback circuit 206, and an internal circuit of the feedback circuit 206 operates using this output voltage $V_{OUT}$ as a power supply voltage.

When the VCC pin is detached from the substrate or a wiring on the substrate is disconnected (these cases are referred to as open abnormalities), the output voltage $V_{OUT}$ is no longer supplied to the VCC pin, the feedback circuit 206 becomes inoperable, and eventually, the output voltage $V_{OUT}$ becomes uncontrollable.

The same problem may occur in a diode rectification-type flyback converter, which includes a rectifier diode instead of the synchronous rectification transistor M2 and the synchronous rectification controller 300, or an LLC converter. According to a DC/DC converter 200 according to the second embodiment to be described later, this problem can be solved.

Figure 10:
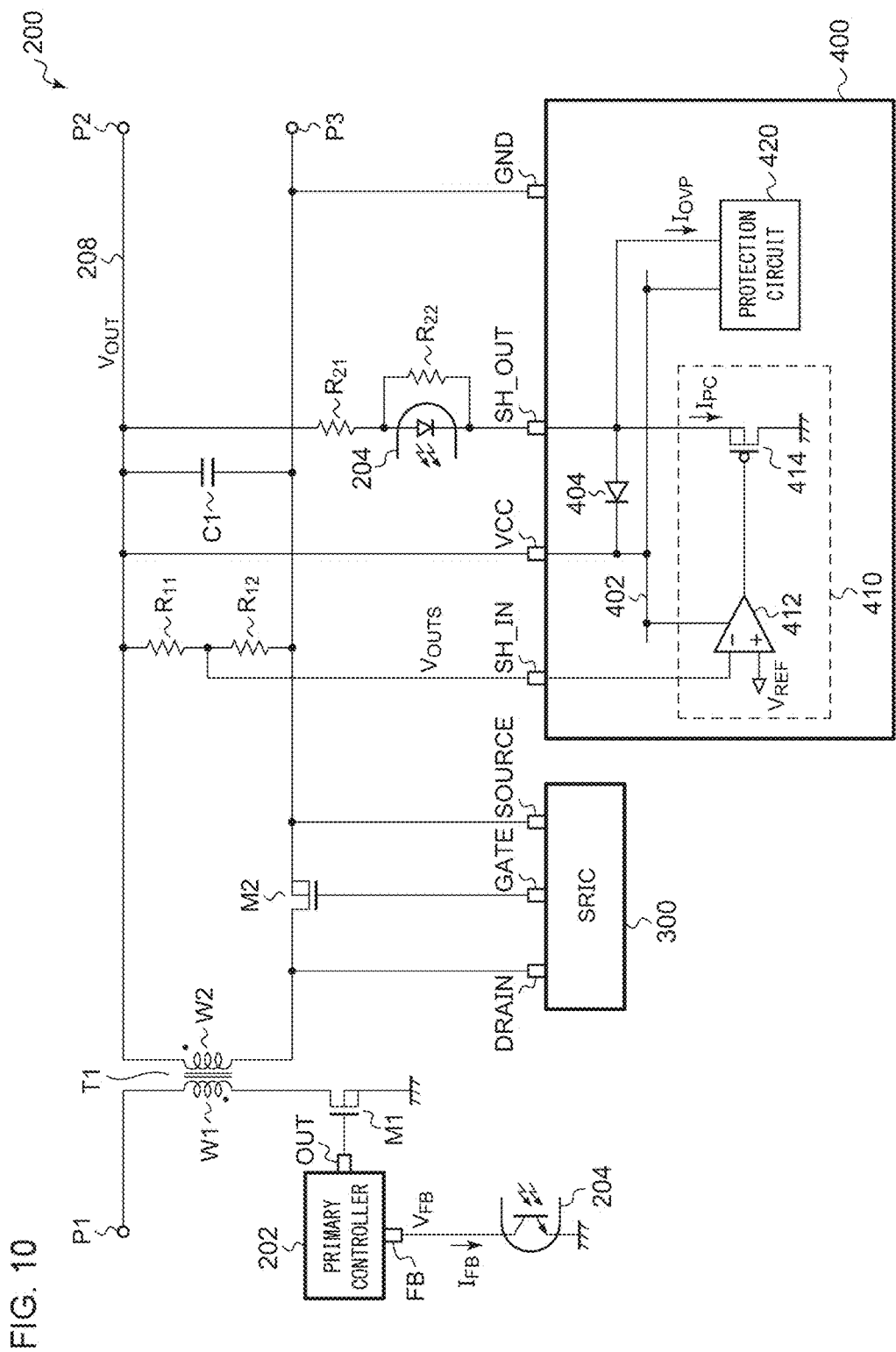
FIG. 10 is a circuit diagram of an isolated DC/DC converter according to a second embodiment.

FIG. 10 is a circuit diagram of the isolated DC/DC converter 200 according to the second embodiment. The DC/DC converter 200 is a flyback converter, receives an input voltage $V_{IN}$ at an input terminal P1 thereof, generates an output voltage $V_{OUT}$ of direct current stabilized to a predetermined target voltage, and supplies the output voltage $V_{OUT}$ to a load connected between an output terminal P2 and a ground terminal P3 (not illustrated).

A transformer T1 has a primary winding W1 and a secondary winding W2. One end of the primary winding W1 is connected to the input terminal P1 and receives the DC input voltage $V_{IN}$. A drain of the switching transistor M1 is connected to the other end of the primary winding W1 of the transformer T1. A sense resistor for current detection may be inserted between a source of the switching transistor M1 and a ground line.

A synchronous rectification transistor M2 and the secondary winding W2 of the transformer T1 are provided in series between the output terminal P2 and the ground terminal P3. An output capacitor C1 is connected between the output terminal P2 and the ground terminal P3.

The photocoupler 204 includes a light emitting element and a light receiving element. The light emitting element is biased by resistors $R_{21}$ and $R_{22}$.

A primary controller 202 is connected to a light receiving element of a photocoupler 204. A feedback signal $V_{FB}$ corresponding to a feedback current $I_{FB}$ flowing in the light receiving element of the photocoupler 204 appears at a feedback (FB) terminal of the primary controller 202.

The primary controller 202 generates a pulse signal having a duty ratio (or a frequency) corresponding to the feedback signal $V_{FB}$, outputs the pulse signal from an output (OUT) terminal, and drives the switching transistor M1. A configuration and a control system of the primary controller 202 are not particularly limited. For example, the primary controller 202 may be a modulator of a current mode.

A synchronous rectification controller 300 controls the synchronous rectification transistor M2. For example, the synchronous rectification controller 300 generates a control pulse based on a drain-source voltage $V_{DS2}$ of the synchronous rectification transistor M2 and supplies a gate pulse corresponding to the control pulse to a gate of the synchronous rectification transistor M2. A configuration and an operation of the synchronous rectification controller 300 are not particularly limited, either, and a well-known technique may be used.

Next, a configuration of a secondary controller 400 will be described.

A secondary controller 400 includes a control input (SH_IN) pin, a control output (SH_OUT) pin, a power supply (VCC) pin, and a ground (GND) pin, which are accommodated in one package. A detection voltage $V_{OUTS}$ corresponding to the output voltage $V_{OUT}$ is input to the SH_IN pin. For example, the detection voltage $V_{OUTS}$ is a voltage obtained by dividing the output voltage $V_{OUT}$ by resistors $R_{11}$ and $R_{12}$. The SH_OUT pin is connected to a light emitting element of the photocoupler 204. The GND pin is connected to the ground terminal P3 (ground line). The power supply voltage $V_{CC}$ is supplied to the VCC pin. In FIG. 10, the output voltage $V_{OUT}$ is used as the power supply voltage $V_{CC}$, but the invention is not limited thereto as will be described later.

The secondary controller 400 includes a power supply line 402, a power supply path 404, a feedback circuit 410, and a protection circuit 420, which are integrated one semiconductor substrate. The power supply line 402 is connected to the VCC pin. The feedback circuit 410 and the protection circuit 420 operate by receiving the power supply voltage $V_{CC}$ of the power supply line 402.

A power supply path 404 is configured so as to supply power in one direction from the SH_OUT pin to the VCC pin. For example, the power supply path 404 may include a rectifier element. The rectifier element includes a diode provided so as to have an anode on the SH_OUT pin side and a cathode on the VCC pin (power supply line 402) side.

The feedback circuit 410 is a so-called shunt regulator, and drives the light emitting element of the photocoupler 204 such that the detection voltage $V_{OUTS}$ approximates to a reference voltage $V_{REF}$, in other words, the output voltage $V_{OUT}$ approximates to its target value $V_{OUT(REF)}$. Specifically, the feedback circuit 410 drives the light emitting element of the photocoupler 204 by a current $I_{PC}$ corresponding to an error between the detection voltage $V_{OUTS}$ and the reference voltage $V_{REF}$.

For example, the feedback circuit 410 includes an error amplifier 412 and a pass transistor 414. The error amplifier 412 amplifies the error between the detection voltage $V_{OUTS}$ and the reference voltage $V_{REF}$. The pass transistor 414 is, for example, a P-channel MOSFET, and has a source connected to the SH_OUT pin and a gate connected to an output of the error amplifier 412. An output signal of the error amplifier 412, that is, the current $I_{PC}$ corresponding to the error between the detection voltage $V_{OUTS}$ and the reference voltage $V_{REF}$ flows to the pass transistor 414. The pass transistor 414 may be an N-channel MOSFET. In addition, the pass transistor 414 may be an NPN-type or a PNP-type bipolar transistor.

A power supply of the error amplifier 412 may be taken from the SH_OUT pin. In this case, the protection circuit 420 is supplied with power from the power supply line 402.

When detecting an abnormal state, the protection circuit 420 supplies a current to the light emitting element of the photocoupler 204. When an abnormality occurs, the forward current flowing in the light emitting element of the photocoupler 204 increases, the feedback current $I_{FB}$ increases, the feedback voltage $V_{FB}$ decreases, and the switching of the switching transistor M1 stops, whereby the circuit is protected.

Although not particularly limited, the abnormal state is an over-voltage state in the present embodiment, and the protection circuit 420 is an OVP circuit that supplies a current $I_{OVP}$ to the photocoupler 204 when detecting an over-voltage state.

The configuration of the DC/DC converter 200 has been described as above. Next, an advantage thereof will be described.

When the VCC pin is detached from a printed circuit board or a wiring connecting the VCC pin and an output line 208 is disconnected, the supply of the power supply voltage $V_{CC}$ to the power supply line 402 is blocked. Then, an alternative power supply voltage is supplied to the power supply line 402 from the SH_OUT pin via the power supply path 404. Accordingly, it is possible to maintain an operation of a circuit block (410 and 420) that receives power supply from the power supply line 402.

In this manner, it is possible to enhance the reliability according to the secondary controller 400 according to the second embodiment.

The invention extends to various apparatuses and circuits that are grasped as the block diagram and the circuit diagram of FIG. 10, or derived from the above description, and are not limited to specific configurations. Hereinafter, more specific configuration examples and modifications will be described in order not to narrow the scope of the invention but to aid understanding of the essence of the invention and the circuit operation and for the sake of clarification thereof.

First Configuration Example

Figure 11:
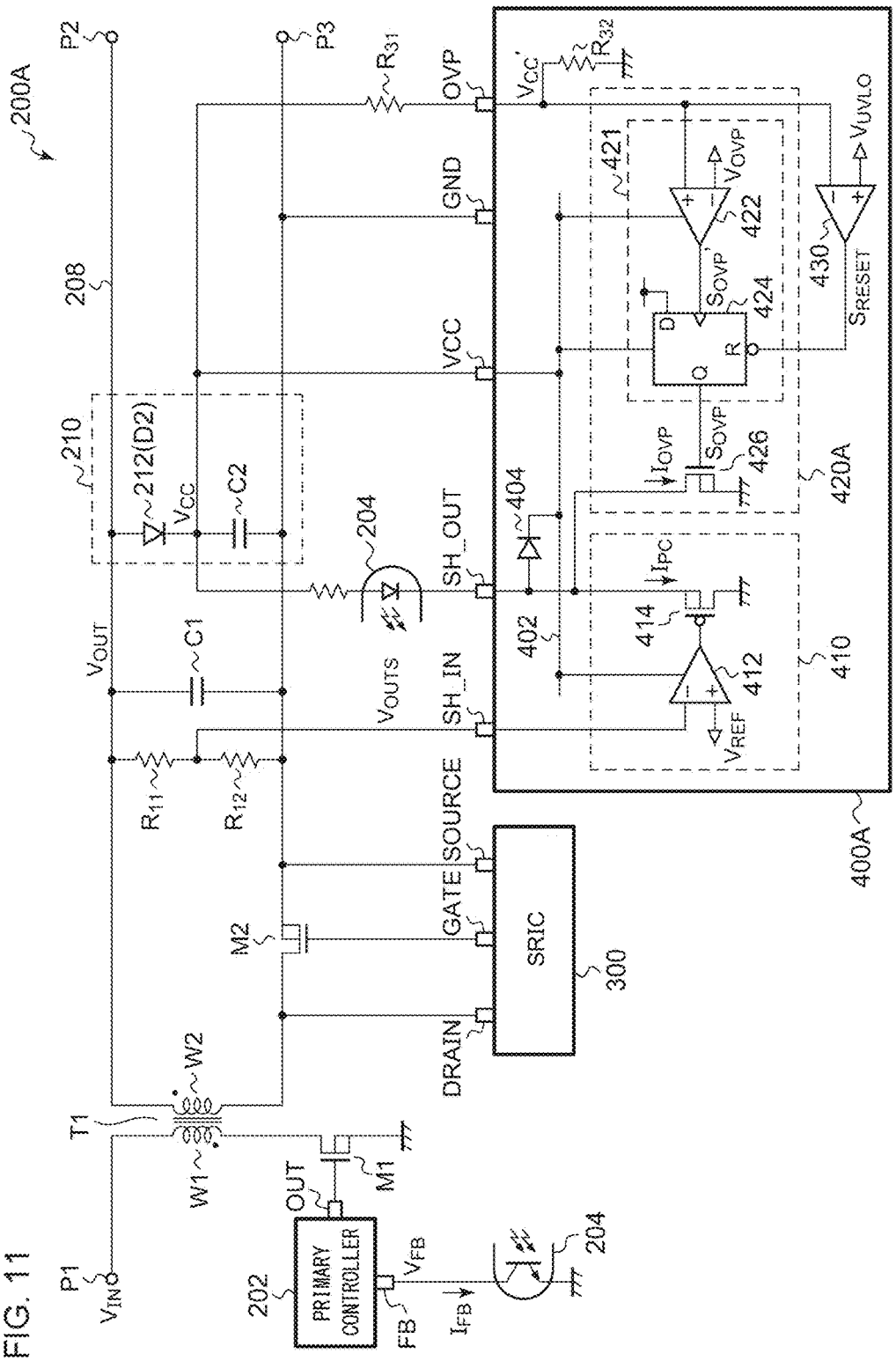
FIG. 11 is a circuit diagram illustrating a first configuration example of the DC/DC converter of FIG. 10.

FIG. 11 is a circuit diagram illustrating a first configuration example (200A) of the DC/DC converter 200. An auxiliary power supply circuit 210 is provided on the secondary side of the DC/DC converter 200A in FIG. 11. The auxiliary power supply circuit 210 includes a power supply capacitor C2 provided separately from the output capacitor C1, and a power supply voltage $V_{CC}$ generated in the power supply capacitor C2 is supplied to the VCC pin of a secondary controller 400A. The auxiliary power supply circuit 210 includes a charging path 212 provided between the auxiliary power supply circuit 210 and the power supply capacitor C2. The charging path 212 may include a rectifier element that allows a current from an output line 208 of the DC/DC converter 200A to the power supply capacitor C2 and blocks a current in the reverse direction. The rectifier element may include a diode D2 provided so as to have an anode on the output line 208 side of the DC/DC converter 200A and a cathode on the power supply capacitor C2 side. Alternatively, the rectifier element may be a switch (transistor).

The power supply capacitor C2 is charged to substantially the same potential as the output voltage $V_{OUT}$ during the operation of the DC/DC converter 200, and accordingly, the power supply voltage $V_{CC}$ having substantially the same potential as the output voltage $V_{OUT}$ is supplied to the VCC pin.

In addition, an anode of the light emitting element of the photocoupler 204 is connected to the power supply capacitor C2 via a resistor in FIG. 11. That is, the power supply voltage $V_{CC}$ from the auxiliary power supply circuit 210 is supplied to the light emitting element.

When the switching operation of the DC/DC converter 200A stops, the output capacitor C1 is discharged by a load current, and a voltage thereof decreases with time. In contrast, the power supply capacitor C2 is discharged by a forward current of the photocoupler 204 and a current flowing in the VCC pin of the secondary controller 400A. The capacity of the power supply capacitor C2 is determined such that the power supply voltage $V_{CC}$ decreases slower than the output voltage $V_{OUT}$ in a stop state of the DC/DC converter 200A.

A protection circuit 420A is an over-voltage protection (OVP) circuit. The power supply voltage $V_{CC}$ is supplied to an over-voltage protection (OVP) pin of a secondary controller 400A via a resistor $R_{31}$. The voltage $V_{CC}'$, obtained by dividing the power supply voltage $V_{CC}$ by an external resistor $R_{31}$ and a built-in resistor $R_{32}$ is generated at the OVP pin. The resistor $R_{32}$ may be an externally-attached part.

As described above, $V_{CC} \approx V_{OUT}$ during a switching operation of the DC/DC converter 200A, and thus, the voltage $V_{CC}'$ of the VCC pin is a voltage corresponding to the output voltage $V_{OUT}$. When the voltage $V_{CC}'$ of the OVP pin exceeds the predetermined over-voltage threshold value $V_{OVP}$, the protection circuit 420A generates the current $I_{OVP}$ and drives the photocoupler 204.

The protection circuit 420A is configured to maintain a drive state of the photocoupler 204 until being reset when the voltage of the OVP pin exceeds the predetermined over-voltage threshold value $V_{OVP}$.

The protection circuit 420A includes an abnormality detection circuit 421 and a protection transistor 426. When detecting the abnormal state (in this case, the over-voltage state), the abnormality detection circuit 421 maintains an asserted state of an abnormality detection signal $S_{OVP}$ until being reset. The protection transistor 426 is turned into the on-state in the asserted state of the abnormality detection signal $S_{OVP}$.

The abnormality detection circuit 421 includes an over-voltage detection comparator 422 and a latch circuit 424. The over-voltage detection comparator 422 compares the voltage $V_{CC}'$ of the OVP pin with the over-voltage threshold value $V_{OVP}$ and asserts a comparison signal $S_{OVP}'$ (for example, sets the comparison signal to a high level) when detecting the over-voltage state ($V_{CC}' > V_{OVP}$). The latch circuit 424 latches the comparison signal $S_{OVP}'$. The latch circuit 424 may include a flip-flop. The protection transistor 426 is connected to the light emitting element of the photocoupler 204 via the SH_OUT pin and is turned into the on-state according to an output $S_{OVP}$ of the latch circuit 424.

The secondary controller 400A may include an under-voltage lockout (UVLO) circuit 430. The UVLO circuit 430 is a reset circuit that asserts a release signal $S_{RESET}$ (for example, sets the release signal to a low level) and resets the latch circuit 424 when $V_{CC}' < V_{UVLO}$ is established. When the OVP state of the protection circuit 420A is released by the UVLO circuit 430, the protection transistor 426 is turned off, and the current $I_{OVP}$ stops flowing.

In the secondary controller 400A, the power supply voltage $V_{CC}$ is supplied to the feedback circuit 410 and the protection circuit 420A via the power supply line 402.

The configuration of the DC/DC converter 200A has been described as above.

According to the DC/DC converter 200A, the voltage is supplied to the power supply line 402 from the SH_OUT pin via the power supply path 404 even when the open abnormality occurs in the VCC pin. Accordingly, the feedback circuit 410 and the protection circuit 420A can continue the operation, and it is possible to enhance the reliability.

According to the DC/DC converter 200A, another problem which may occur in the DC/DC converter 200 of FIG. 10 can be solved. A description will be given regarding over-voltage protection in a configuration (first comparison technique) in which an output voltage $V_{OUT}$ is directly supplied to a VCC pin as illustrated in FIG. 10.

Figure 12:
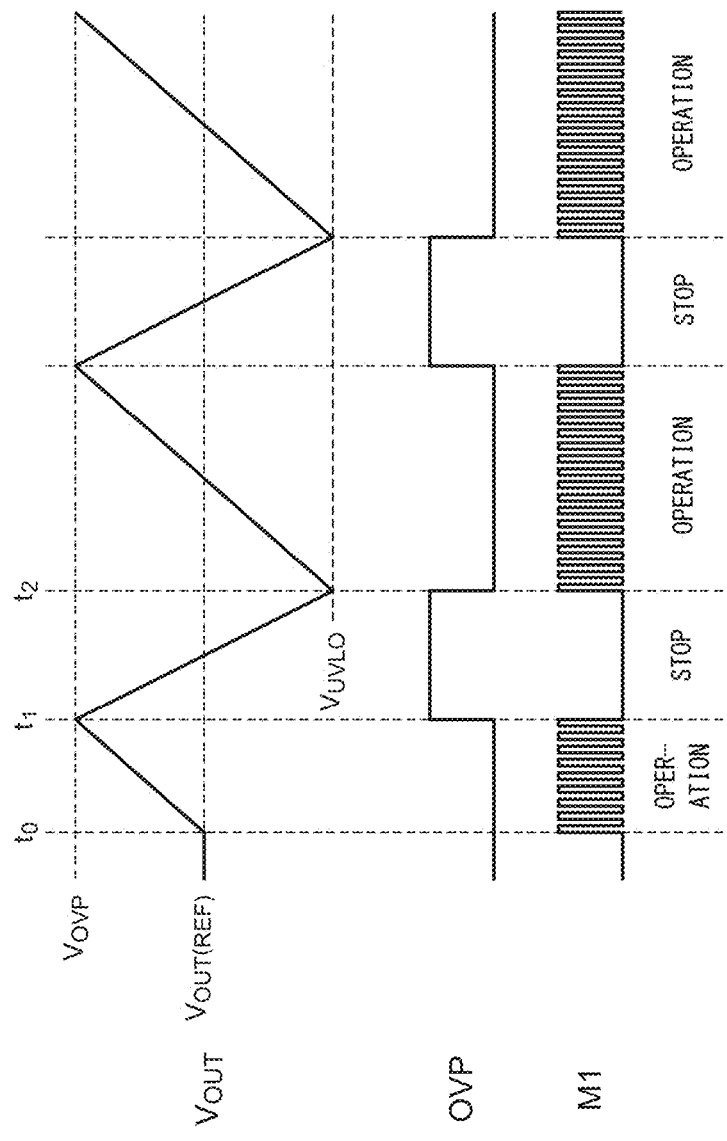
FIG. 12 is an operation waveform diagram of a DC/DC converter according to a comparison technique.

FIG. 12 is an operation waveform diagram of a DC/DC converter 200 according to the first comparison technique. The DC/DC converter 200 is in a normal state before time $t_0$, and the output voltage $V_{OUT}$ is stabilized at its target value $V_{OUT(REF)}$. At time $t_0$, a certain abnormality occurs, and an output voltage $V_{OUT}$ deviates from a target value $V_{OUT(REF)}$ and starts to rise.

When the output voltage $V_{OUT}$ exceeds an over-voltage threshold value $V_{OVP}$ at time $t_1$, a protection circuit 420 is turned into a state of supplying a current low to a light emitting element of a photocoupler 204 and is fixed (latched) in such a state until being reset. As a result, a feedback current $I_{FB}$ increases, a feedback signal $V_{FB}$ decreases, and the switching of a switching transistor M1 stops.

Since the switching of an output capacitor C1 stops when the switching of the switching transistor M1 stops, the output voltage $V_{OUT}$ gradually decreases with time, and the power supply voltage $V_{CC}$ supplied to a secondary controller 400 also gradually decreases. Therefore, when the output voltage $V_{OUT}$ decreases, the protection circuit 420 becomes inoperable and hardly maintains the current $I_{OVP}$.

When the current low (and the current $I_{ERR}$) becomes zero at time $t_2$ due to the decrease of the output voltage $V_{OUT}$, that is, the power supply voltage $V_{CC}$, the feedback current $I_{FB}$ also becomes zero, the feedback signal $V_{FB}$ rises, and the switching of the switching transistor M1 restarts. The restart of switching causes the output voltage $V_{OUT}$ to start rising again.

When an over-voltage factor remains, the output voltage $V_{OUT}$ reaches the over-voltage threshold value $V_{OVP}$ again. The DC/DC converter 200 alternately repeats the operation and stop in a time-division manner (referred to as an intermittent mode).

There is a case where heat generation of circuit elements constituting the DC/DC converter 200, more specifically, a synchronous rectification transistor M2 and the switching transistor M1 becomes a problem. In the intermittent mode of FIG. 12, heat is generated during an operation period so that temperature rises, and the temperature is relaxed during a stop period. Therefore, the temperature of the circuit element steadily rises when the stop period is short. The problem that may occur in the first comparison technique has been described above.

Next, the over-voltage protection operation of the DC/DC converter 200A in FIG. 11 will be described.

Figure 13:
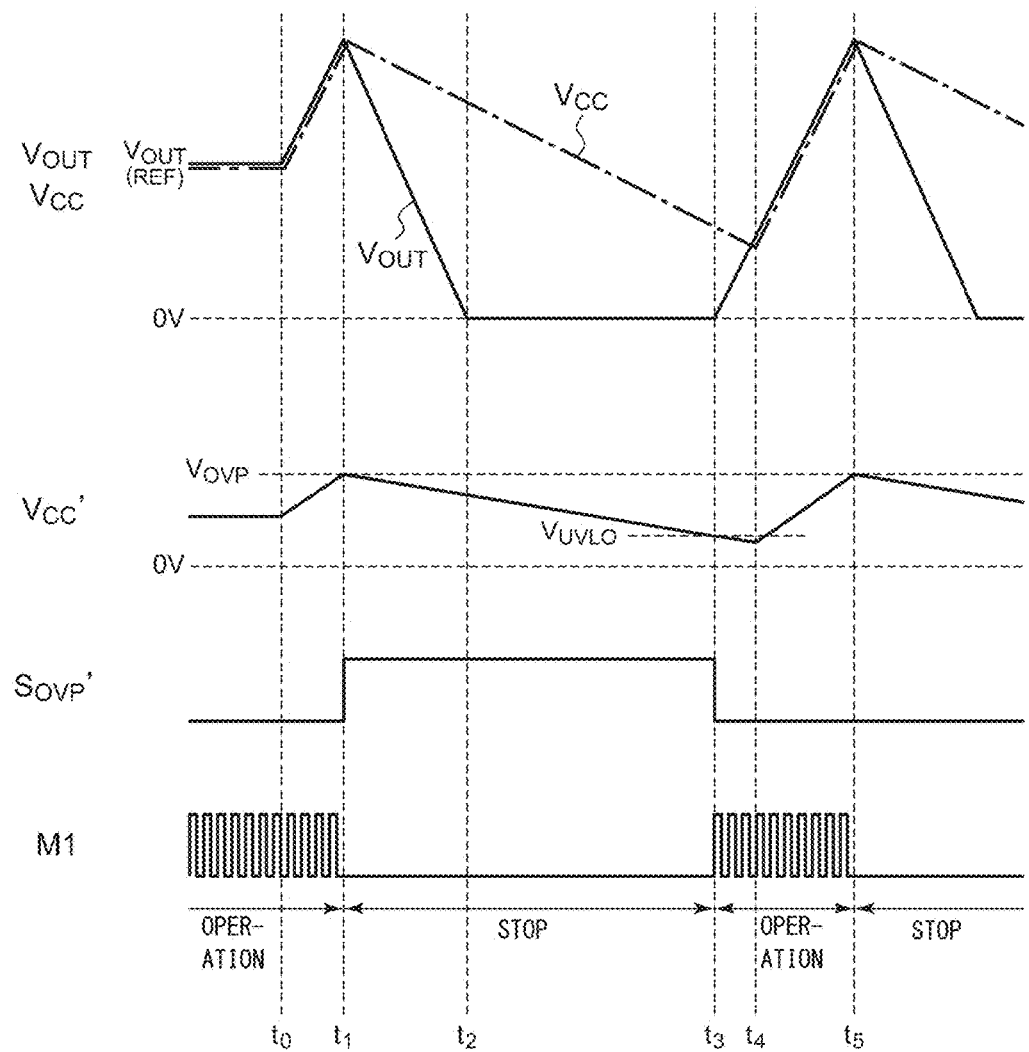
FIG. 13 is an operation waveform diagram of the DC/DC converter of FIG. 11.

FIG. 13 is an operation waveform diagram of the DC/DC converter 200A of FIG. 11.

The DC/DC converter 200 is in a normal state before time $t_0$, and the output voltage $V_{OUT}$ is stabilized at its target value $V_{OUT(REF)}$. At time $t_0$, a certain abnormality occurs, and an output voltage $V_{OUT}$ deviates from a target value $V_{OUT(REF)}$ and starts to rise.

As the output voltage $V_{OUT}$ rises, the supply voltage $V_{CC}$ and the voltage $V_{CC}'$ of the OVP pin rise. Further, when the voltage $V_{CC}'$ exceeds the over-voltage threshold value $V_{OVP}$ at time $t_1$, the protection circuit 420 is turned into a state of supplying the current $I_{OVP}$ to the light emitting element of the photocoupler 204 and is fixed (latched) in such a state. As a result, a feedback current $I_{FB}$ increases, a feedback signal $V_{FB}$ decreases, and the switching of a switching transistor M1 stops.

Since the switching of an output capacitor C1 stops when the switching of a switching transistor M1 stops, the output voltage $V_{OUT}$ gradually decreases with time, and the power supply voltage $V_{CC}$ supplied to the secondary controller 400A also gradually decreases. The output voltage $V_{OUT}$ decreases to 0 V at time $t_2$. In contrast, the power supply voltage $V_{CC}$ decreases slower than the output voltage $V_{OUT}$.

When the voltage $V_{CC}'$ of the OVP pin decreases to the UVLO voltage $V_{UVLO}$ at time $t_3$, the protection state of the protection circuit 420A is released, and low becomes zero. As a result, the feedback current $I_{FB}$ also becomes zero, the feedback signal $V_{FB}$ rises, and the switching of the switching transistor M1 restarts. The output voltage $V_{OUT}$ rises again due to the restart of switching, and the power supply voltage $V_{CC}$ also rises.

When an over-voltage factor remains, the output voltage $V_{OUT}$ rises above the target voltage $V_{OUT(REF)}$ again. Further, when the voltage $V_{CC}'$ of the OVP pin exceeds the over-voltage threshold value $V_{OVP}$, the protection state is formed again. The DC/DC converter 200A alternately repeats the operation and stop in a time-division manner while the over-voltage factor continues.

The operation of the DC/DC converter 200A has been described as above. According to the DC/DC converter 200A, a stop period in the intermittent mode can be made longer than that in the DC/DC converter 200 in FIG. 10. As described above, circuit elements generate heat during an operation period so that temperature rises, and the temperature is relaxed during the stop period. Meanwhile, it is possible to suppress the temperature rise of the circuit element by increasing the stop period.

The length of the stop period can be determined based on a capacitance value of the power supply capacitor C2 so as to fall within an appropriate temperature range regardless of decrease speed of the output voltage $V_{OUT}$.

Meanwhile, the stop period in FIG. 12 also increases in the first comparison technique when a discharge current of the capacitor C1 during the stop period is sufficiently small. Therefore, in such a case, power may be supplied from the output line 208 to the power supply pin of the secondary controller 400.

The following advantage of the DC/DC converter 200A in FIG. 11 as compared with the DC/DC converter 200 in FIG. 10 will be further described. An operation in a configuration (second comparison technique) in which a light emitting element of a photocoupler 204 is connected to an output line 208 as illustrated in FIG. 10 will be described in order to clarify this advantage.

In this second comparison technique, when a protection circuit 420 drives the photocoupler 204 in an abnormal state (for example, an over-voltage state), an output capacitor C1 is discharged by a forward current and an output current, and thus, an output voltage $V_{OUT}$ decreases. When the output voltage $V_{OUT}$ decreases, the forward current ($I_{OVP}$) of the photocoupler 204 decreases so that the light emission stops, the operation on the primary side restarts, the output voltage $V_{OUT}$ rises, and the photocoupler 204 can emit light. By repeating this operation, equilibrium is achieved at a certain voltage level in the over-voltage state when the output voltage $V_{OUT}$ is higher than 0 V.

There is also a case where it is desired to completely stop switching on the primary side during a stop period and to completely decrease the output voltage $V_{OUT}$ to 0 V depending on the application. This is a problem that may occur in the second comparison technique.

According to the DC/DC converter 200A of FIG. 11, the power supply voltage $V_{CC}$ from the auxiliary power supply circuit 210 is supplied to the light emitting element of the photocoupler 204. Since the power supply voltage $V_{CC}$ decreases slower than the output voltage $V_{OUT}$, the forward current of the photocoupler 204 continues to flow until the power supply voltage $V_{CC}$ becomes sufficiently low after the output voltage $V_{OUT}$ has decreased to 0 V. Accordingly, it is possible to completely stop the switching of the switching transistor M1 during the stop period and to decrease the output voltage $V_{OUT}$ to 0 V.

Modification

Figure 14A:
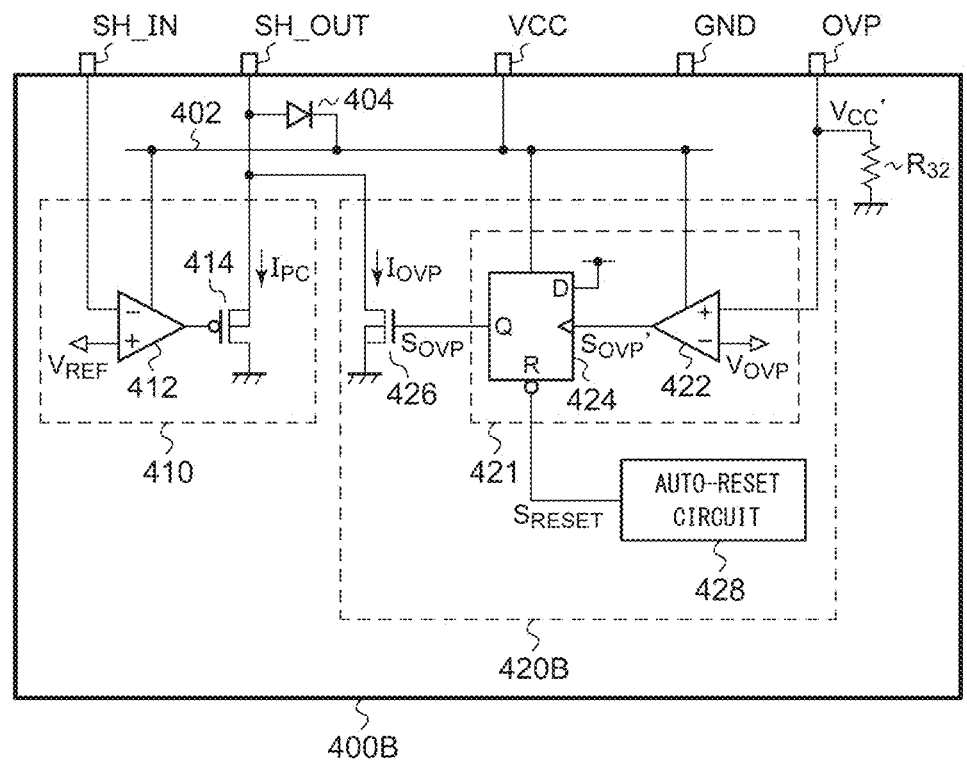
FIGS. 14A and 14B are circuit diagrams of a modification of a secondary controller of FIG. 11.
Figure 14B:
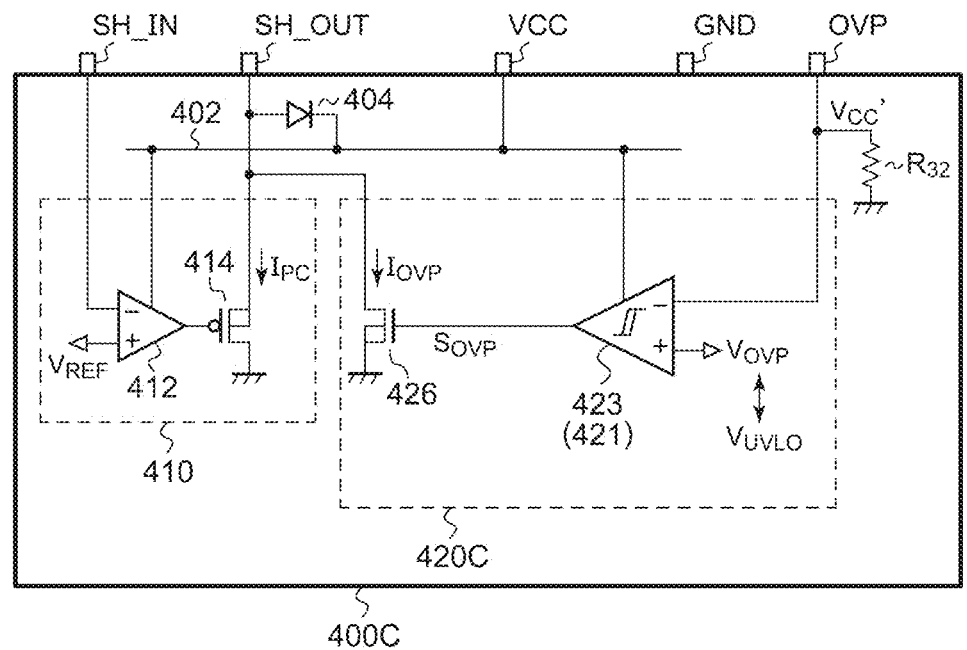

FIGS. 14A and 14B are circuit diagrams of modifications (400B and 400C) of the secondary controller 400A of FIG. 11. In the secondary controller 400B of FIG. 14A, a protection circuit 420B includes an auto-reset circuit 428. The auto-reset circuit 428 also operates by receiving the voltage $V_{CC}$ of the power supply line 402.

The auto-reset circuit 428 includes a timer circuit, and resets the latch circuit 424 after a lapse of a predetermined time since the protection circuit 420B enters the OVP state. According to this modification, it is possible to set the stop period in accordance with the time measured by the auto-reset circuit 428.

In the secondary controller 400C of FIG. 14B, the protection circuit 420C includes a hysteresis comparator 423 and a protection transistor 426. The hysteresis comparator 423 compares the voltage $V_{CC}'$ of the OVP pin with a threshold voltage which changes between two values of $V_{OVP}$ and $V_{UVLO}$, and generates the abnormality detection signal $S_{OVP}$ corresponding to the comparison result. According to this configuration, the operation of FIG. 13 can be realized.

Second Configuration Example

Figure 15:
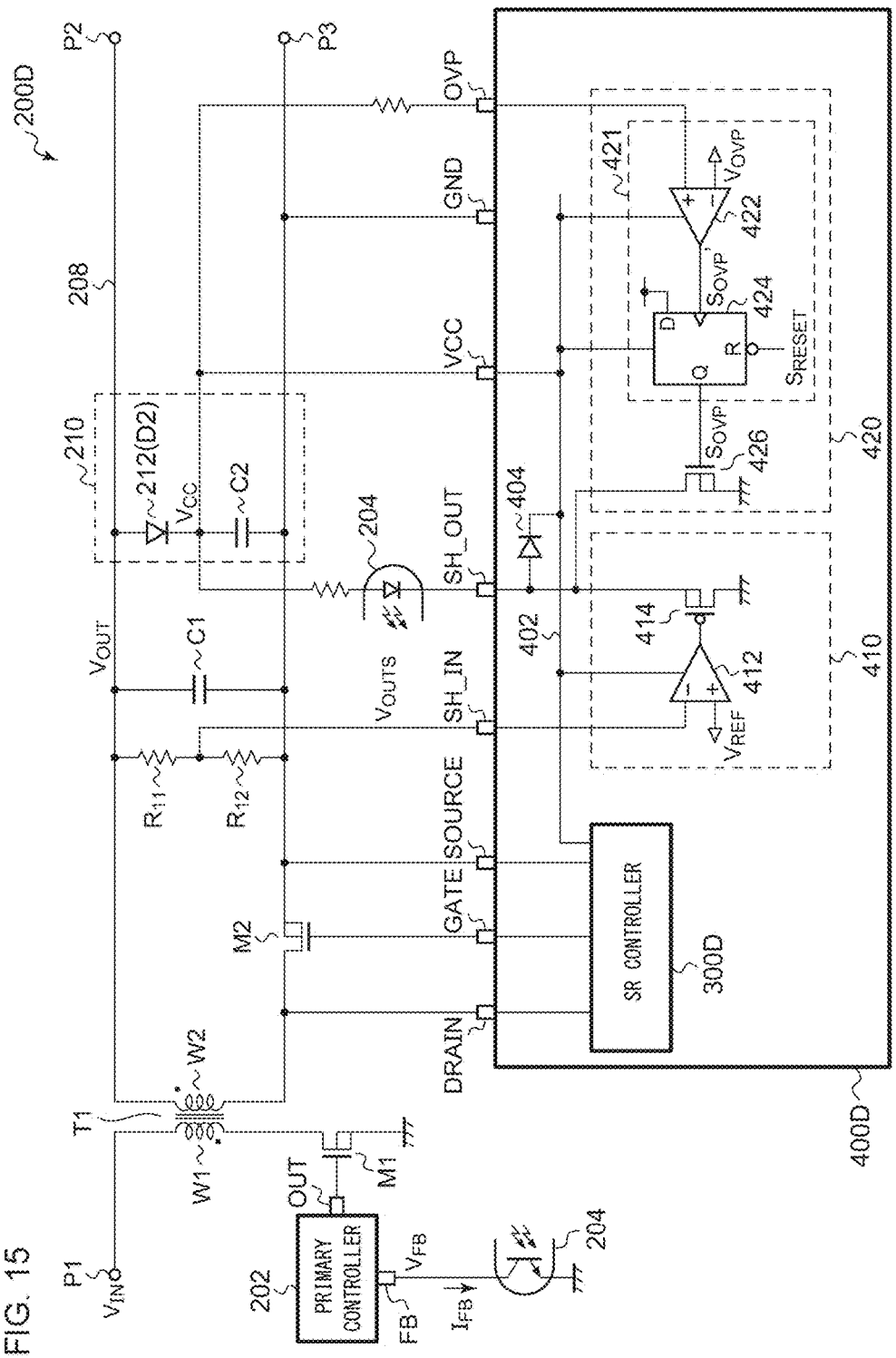
FIG. 15 is a circuit diagram illustrating a second configuration example of the DC/DC converter of FIG. 10.

FIG. 15 is a circuit diagram illustrating a second configuration example (200D) of the DC/DC converter. In the DC/DC converter 200D, not only the feedback circuit 410 and the protection circuit 420 but also a synchronous rectification controller 300D is accommodated in the same package in the secondary controller 400D. These parts may be integrated on the same semiconductor substrate (a die or a chip) or may be integrated in the state of being divided into a plurality of dies.

A SOURCE pin is a ground terminal of the synchronous rectification controller 300D. A GATE pin and a DRAIN pin are connected to a gate and a drain of the synchronous rectification transistor M2. The power supply voltage $V_{CC}$ is also supplied to the synchronous rectification controller 300D from the power supply line 402. The synchronous rectification controller 300D may be built in the secondary controllers 400B and 400C according to the modifications of FIGS. 14A and 14B.

The invention has been described as above based on the embodiments. Those examples are illustrative, and it is understood by those skilled in the art that various types of modification examples can be made in combinations of the respective components and the respective processes, and further, such modification examples are included in a range of the invention. Hereinafter, such modifications will be described.

First Modification

The protection circuit 420 is not limited to the overvoltage protection circuit. For example, the protection circuit 420 may detect a non-switchable state where the synchronous rectification transistor M2 is not switchable and be turned into an activated state in the non-switchable state, and drive the light emitting element of the photocoupler 204. For example, the protection circuit 420 may detect an open abnormality of a GATE pin of the secondary controller 400 or may detect an open abnormality of a DRAIN pin of the secondary controller 400.

Second Modification

Although the synchronous rectification-type flyback converter has been taken as an example in the embodiment, the invention is also applicable to a diode rectification-type flyback converter. In addition, the invention is also applicable to an LLC converter.

Third Modification

The configuration of the power supply path 404 is not limited to the diode as illustrated in FIG. 10, and may be configured using a switch that is turned on when a voltage of the SH_OUT pin is higher than a voltage of the VCC pin and turned off when the voltage of the SH_OUT pin is not higher than the voltage of the VCC pin.

Fourth Modification

As in the description relating to the second comparison technique described above, an anode of a light emitting element of the photocoupler 204 of FIG. 11 may be connected to the output line 208 via a resistor in an application where no problem occurs even if the output voltage $V_{OUT}$ is stabilized at a certain voltage level in the abnormal state.

Fifth Modification

The power supply voltage supplied to the VCC pin of the secondary controller 400 is not limited to the output voltage $V_{OUT}$ or the voltage generated by the auxiliary power supply circuit 210 in FIG. 11. For example, the auxiliary power supply circuit 210 may be configured using a step-up charge pump having the output voltage $V_{OUT}$ as an input, and an output voltage thereof may be supplied to the VCC pin.

Incidentally, arbitrary technical features of the first embodiment and arbitrary technical features of the second embodiment can be combined within a scope where there is no factor inhibiting such features, and such a combined technique is also included in the scope of the invention.

Application

Figure 16:
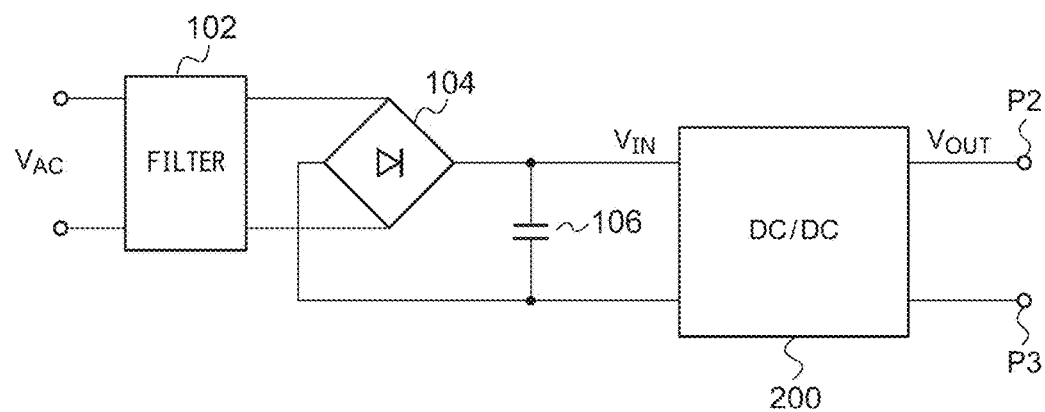
FIG. 16 is a circuit diagram of an AC/DC converter including a DC/DC converter.

Next, an application of the DC/DC converter 200 described in the first and second embodiments will be described. The DC/DC converter 200 can be used in an AC/DC converter 100. FIG. 16 is a circuit diagram of the AC/DC converter 100 including the DC/DC converter 200.

The AC/DC converter 100 includes a filter 102, a rectifier circuit 104, a smoothing capacitor 106, and the DC/DC converter 200. The filter 102 removes noise of an AC voltage $V_{AC}$. The rectifier circuit 104 is a diode bridge circuit that performs full-wave rectification of the commercial AC voltage $V_{AC}$. The smoothing capacitor 106 smoothes the full-wave rectified voltage and generates the DC voltage $V_{IN}$. The DC/DC converter 200 receives the DC voltage $V_{IN}$ and generates the output voltage $V_{OUT}$.

Figure 17:
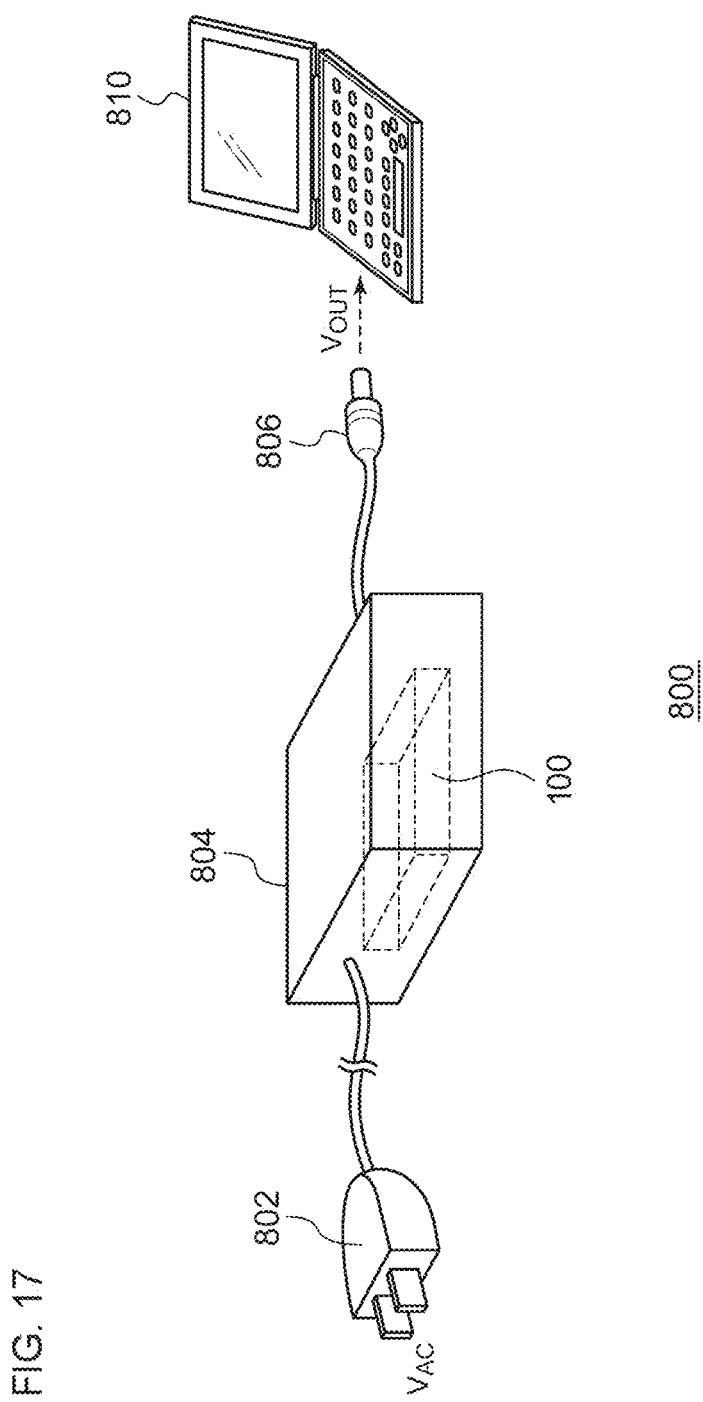
FIG. 17 is a view illustrating an AC adapter including an AC/DC converter.

FIG. 17 is a view illustrating an AC adapter 800 including the AC/DC converter 100. The AC adapter 800 includes a plug 802, a housing 804, and a connector 806. The plug 802 receives the commercial AC voltage $V_{AC}$ from an electrical outlet (not illustrated). The AC/DC converter 100 is mounted inside the housing 804. The DC output voltage $V_{OUT}$ generated by the AC/DC converter 100 is supplied from the connector 806 to an electronic device 810. Examples of the electronic device 810 include a laptop computer, a digital camera, a digital video camera, a cellular phone, a portable audio player, and the like.

Figure 18A:
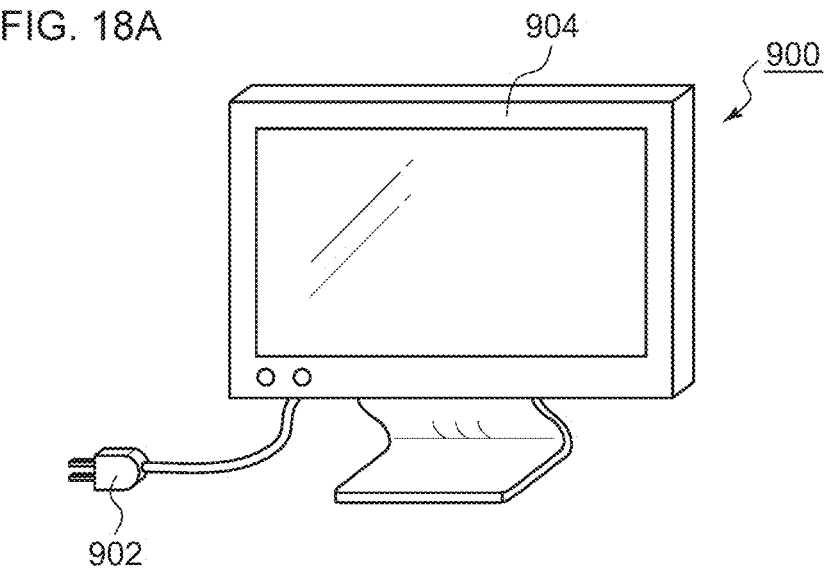
FIGS. 18A and 18B are views illustrating an electronic device including an AC/DC converter.
Figure 18B:
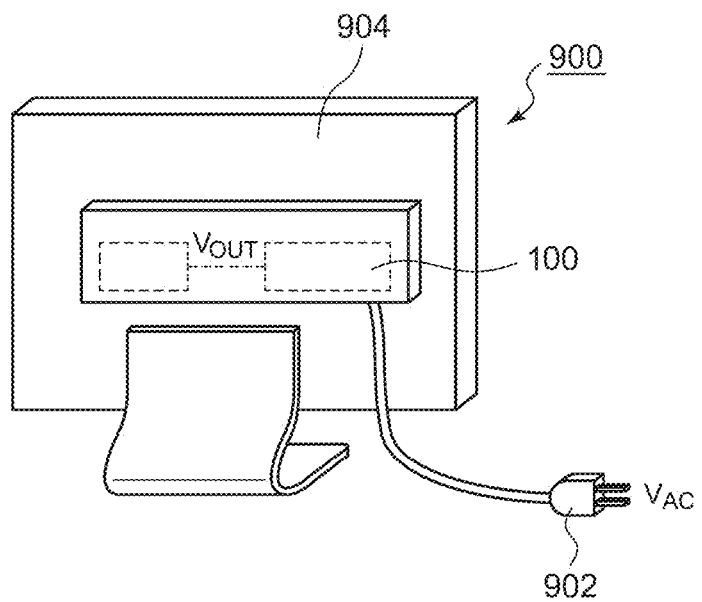

FIGS. 18A and 18B are views illustrating an electronic device 900 including the AC/DC converter 100. Although the electronic device 900 in FIGS. 18A and 18B is a display device, a type of the electronic device 900 is not particularly limited, and may be a device with a built-in power supply device such as an audio device, a refrigerator, a washing machine, and a vacuum cleaner.

A plug 902 receives a commercial AC voltage $V_{AC}$ from an electrical outlet (not illustrated). The AC/DC converter 100 is mounted inside a housing 904. The DC output voltage $V_{OUT}$ generated by the AC/DC converter 100 is supplied to a load, such as a microcomputer, a digital signal processor (DSP), a power supply circuit, an illumination device, an analog circuit, and a digital circuit, which is mounted inside the same housing 904.

While the preferred embodiments of the present invention have been described using specific terms, such description is for illustrative purposes only, and it is to be understood that changes and variations may be made without departing from the spirit or scope of the appended claims.

What is claimed is:

1. A secondary controller used in an isolated synchronous rectification-type DC/DC converter, comprising:
    a control output pin to be coupled to a light emitting element of a photocoupler;
    a power supply pin to be coupled to receive a power supply voltage;
    a control input pin to be coupled to receive a detection voltage corresponding to an output voltage of the DC/DC converter;
    a feedback circuit structured to amplify an error between the detection voltage and a reference voltage and to supply a current corresponding to the error to the light emitting element of the photocoupler; and
    a power supply path coupled to supply power from the control output pin to the power supply pin.

2. The secondary controller according to claim 1, wherein the power supply path includes a rectifier element.

3. The secondary controller according to claim 1, wherein the power supply path includes a diode having an anode coupled to the control output pin and a cathode coupled to the power supply pin side.

4. The secondary controller according to claim 1, further comprising a protection circuit structured to drive the light emitting element when detecting an abnormal state, and wherein the power supply voltage of the power supply pin is supplied to at least a part of the protection circuit.

5. The secondary controller according to claim 4, wherein the protection circuit is structured to be activated and to drive the light emitting element when detecting an over-voltage state, and wherein the power supply voltage supplied to the power supply pin is decrease slower than the output voltage in a stop state of the DC/DC converter.

6. The secondary controller according to claim 5, wherein the protection circuit includes:
- an over-voltage detection comparator structured to assert an abnormality detection signal when detecting an over-voltage state;
- a latch circuit structured to latch the abnormality detection signal; and
- a protection transistor coupled to the light emitting element and being turned into an on-state according to an output of the latch circuit.

7. The secondary controller according to claim 6, wherein the abnormality detection signal is negated when the power supply voltage falls below a release threshold value.

8. The secondary controller according to claim 6, wherein the abnormality detection signal is negated after a lapse of a predetermined time from its assertion.

9. The secondary controller according to claim 5, the protection circuit includes:
- a hysteresis comparator structured to assert the abnormality detection signal when a monitoring target voltage exceeds an upper threshold value and to negate the abnormality detection signal when the monitoring target voltage falls below a lower threshold value; and
- a protection transistor coupled to the light emitting element and being turned into an on-state according to the abnormality detection signal.

10. The secondary controller according to claim 1, wherein the feedback circuit includes:
- an error amplifier structured to amplify the error between the detection voltage and the reference voltage; and
- a pass transistor coupled to the control output pin and being driven according to an output signal of the error amplifier.

11. The secondary controller according to claim 1, being accommodated in a same package as a synchronous rectification controller structured to drive a synchronous rectification transistor on a secondary side of the DC/DC converter.

12. The isolated synchronous rectification-type DC/DC converter comprising the secondary controller according to claim 1.

13. An isolated synchronous rectification-type DC/DC converter comprising:
- a transformer having a primary winding and a secondary winding;
- a switching transistor coupled to the primary winding of the transformer;
- an output capacitor being charged by a current flowing in the secondary winding of the transformer;
- a photocoupler having a light emitting element and a light receiving element;
- a feedback circuit structured to drive the light emitting element of the photocoupler such that a detection voltage corresponding to an output voltage of the output capacitor approximates to a reference voltage;
- a primary controller coupled to the light receiving element of the photocoupler and structured to control the switching transistor corresponding to a feedback signal based on a state of the light receiving element;
- a protection circuit structured to be activated and to drive the light emitting element when detecting an abnormal state;
- an auxiliary power supply circuit including a power supply capacitor provided separately from the output capacitor and structured to supply a power supply voltage generated in the power supply capacitor to at least a part of a power supply line of the protection circuit; and
- a rectifier element provided between a cathode of the light emitting element of the photocoupler and the power supply line.

14. The DC/DC converter according to claim 13, wherein the power supply voltage decreases slower than the output voltage in a stop state of the DC/DC converter.

15. The DC/DC converter according to claim 14, wherein the power supply voltage from the auxiliary power supply circuit is supplied to an anode of the light emitting element of the photocoupler.

16. The DC/DC converter according to claim 13, wherein the rectifier element includes a diode.

17. The DC/DC converter according to claim 13, wherein the protection circuit includes
- an abnormality detection circuit structured to maintain assertion of an abnormality detection signal until being reset when detecting the abnormal state; and
- a protection transistor which is turned into an on-state in an asserted state of the abnormality detection signal, and wherein the power supply voltage may be supplied to the abnormality detection circuit.

18. The DC/DC converter according to claim 17, wherein the abnormality detection signal is negated when the power supply voltage falls below a release threshold value.

19. The DC/DC converter according to claim 17, wherein the abnormality detection signal is negated after a lapse of a predetermined time from assertion thereof.

20. The DC/DC converter according to claim 13, wherein the protection circuit is an over-voltage protection circuit.

21. The DC/DC converter according to claim 13, wherein the auxiliary power supply circuit further includes a charging path from the output capacitor to the power supply capacitor.

22. The DC/DC converter according to claim 21, wherein the charging path includes a rectifier element that allows a current from an output line of the DC/DC converter to the power supply capacitor and blocks a current in the reverse direction.

23. The DC/DC converter according to claim 13, wherein the charging path includes a diode having an anode on the output line side of the DC/DC converter and a cathode on the power supply capacitor side.

24. An electronic device comprising:
- a load;
- a diode rectifier circuit structured to performs full-wave rectification of a commercial AC (alternating current) voltage;
- a smoothing capacitor coupled to smooth an output voltage of the diode rectifier circuit and to generate a DC input voltage; and
- the DC/DC converter according to claim 13, which steps down the DC input voltage and supplies the stepped-down DC input voltage to the load.

25. A power adapter comprising:
   a diode rectifier circuit structured to perform full-wave rectification of a commercial AC voltage;
   a smoothing capacitor coupled to smooth an output voltage of the diode rectifier circuit and to generate a DC input voltage; and
   the DC/DC converter according to claim 13, which steps down the DC input voltage and supplies the stepped-down DC input voltage to a load.

26. A method for controlling an isolated synchronous rectification-type DC/DC converter, the method comprising:
   controlling a switching transistor coupled to a primary winding of a transformer;
   rectifying a current flowing in a secondary winding of the transformer to charge an output capacitor and generating an output voltage;
   generating a power supply voltage by a power supply capacitor provided separately from the output capacitor;
   supplying the power supply voltage to a secondary controller which drives a light emitting element of a photocoupler and a cathode of the light emitting element;
   maintaining a state of driving the light emitting element when detecting an abnormal state; and
   supplying power from a cathode of the light emitting element of the photocoupler to the secondary controller when supply of the power supply voltage to the secondary controller is interrupted.

* * * * *